United States Patent
Smith et al.

(10) Patent No.: US 8,736,133 B1
(45) Date of Patent: May 27, 2014

(54) METHODS AND APPARATUS FOR OVERLAPPING WINDINGS

(71) Applicant: Boulder Wind Power, Inc., Louisville, CO (US)

(72) Inventors: James S. Smith, Lyons, CO (US); James D. Duford, Polson, MT (US); James D. Jore, Polson, MT (US); Lincoln M. Jore, Ronan, MT (US); Matthew B. Jore, Ronan, MT (US); Brian J. Sullivan, Boulder, CO (US)

(73) Assignee: Boulder Wind Power, Inc., Louisville, CO (US)

( * ) Notice: Subject to any disclaimer, the term of this patent is extended or adjusted under 35 U.S.C. 154(b) by 0 days.

(21) Appl. No.: 13/829,123

(22) Filed: Mar. 14, 2013

(51) Int. Cl.
 *H02K 23/26* (2006.01)
(52) U.S. Cl.
 USPC .......................................................... 310/208
(58) Field of Classification Search
 USPC ................................................. 310/206–208
 See application file for complete search history.

(56) References Cited

U.S. PATENT DOCUMENTS

| | | | |
|---|---|---|---|
| 3,793,530 A | 2/1974 | Carter | |
| 3,796,039 A | 3/1974 | Lucien | |
| 4,035,659 A | 7/1977 | Jeppson | |
| 4,168,439 A | 9/1979 | Palma | |
| 4,242,628 A | 12/1980 | Mohan et al. | |
| 4,261,441 A | 4/1981 | Wood | |
| 4,281,965 A | 8/1981 | Stjernholm | |
| 4,291,233 A | 9/1981 | Kirschbaum | |
| 4,292,532 A | 9/1981 | Leroux | |
| 4,318,019 A | 3/1982 | Teasley et al. | |
| 4,336,475 A * | 6/1982 | Morinaga et al. | 310/198 |
| 4,418,287 A | 11/1983 | Syverson | |
| 4,658,162 A | 4/1987 | Koyama et al. | |
| 4,720,640 A | 1/1988 | Anderson et al. | |
| 4,804,574 A | 2/1989 | Osawa et al. | |
| 4,906,060 A | 3/1990 | Claude | |
| 4,970,404 A | 11/1990 | Barger | |

(Continued)

FOREIGN PATENT DOCUMENTS

| | | |
|---|---|---|
| EP | 1732011 | 12/2006 |
| JP | 10-285894 A | 10/1998 |
| WO | WO 2010/083054 | 7/2010 |

OTHER PUBLICATIONS

International Search Report and Written Opinion for International Application No. PCT/US2010/000112, mailed Mar. 16, 2010.

(Continued)

*Primary Examiner* — Dang Le
(74) *Attorney, Agent, or Firm* — Cooley LLP

(57) ABSTRACT

A first winding portion from a set of winding portions has a set of coils. Each coil of the first winding portion is associated with a different electrical phase from a set of electrical phases. Each coil of the first winding portion circumscribes a different area from a set of areas circumscribed by the set of coils of the first winding portion. A second winding portion has a set of coils associated with the set of electrical phases and a third winding portion has a set of coils associated with the set of electrical phases. The first winding portion at least partially overlaps the second winding portion and the third winding portion such that each area from the set of area is substantially circumscribed by a coil associated with each electrical phase from the set of electrical phases.

26 Claims, 8 Drawing Sheets

(56) References Cited

U.S. PATENT DOCUMENTS

| | | | |
|---|---|---|---|
| 4,992,920 A | 2/1991 | Davis | |
| 4,994,684 A | 2/1991 | Lauw et al. | |
| 5,028,804 A | 7/1991 | Lauw | |
| 5,083,077 A | 1/1992 | Wallace et al. | |
| 5,099,162 A | 3/1992 | Sawada | |
| 5,237,230 A | 8/1993 | Sugiyama et al. | |
| 5,239,251 A | 8/1993 | Lauw | |
| 5,260,617 A | 11/1993 | Leibowitz | |
| 5,289,042 A | 2/1994 | Lis | |
| 5,299,913 A | 4/1994 | Heidelberg | |
| 5,315,159 A | 5/1994 | Gribnau | |
| 5,370,711 A | 12/1994 | Audit et al. | |
| 5,418,446 A | 5/1995 | Hallidy | |
| 5,439,488 A | 8/1995 | Audit et al. | |
| 5,506,453 A | 4/1996 | McCombs | |
| 5,525,894 A | 6/1996 | Heller | |
| 5,587,643 A | 12/1996 | Heller | |
| 5,589,722 A | 12/1996 | Sakaguchi et al. | |
| 5,619,085 A | 4/1997 | Shramo | |
| 5,783,894 A | 7/1998 | Wither | |
| 5,798,631 A | 8/1998 | Spee et al. | |
| 5,798,632 A | 8/1998 | Muljadi | |
| 5,842,312 A | 12/1998 | Krumme et al. | |
| 5,844,324 A | 12/1998 | Spriggle | |
| 5,844,341 A | 12/1998 | Spooner et al. | |
| 5,986,438 A | 11/1999 | Wallace et al. | |
| 6,016,015 A | 1/2000 | Willard, Jr. | |
| 6,040,650 A * | 3/2000 | Rao | 310/268 |
| 6,064,123 A | 5/2000 | Gislason | |
| 6,066,945 A | 5/2000 | Shimazu et al. | |
| 6,072,303 A | 6/2000 | Nickoladze et al. | |
| 6,097,104 A | 8/2000 | Russell et al. | |
| 6,153,944 A | 11/2000 | Clark | |
| 6,157,147 A | 12/2000 | Lin | |
| 6,160,336 A | 12/2000 | Baker, Jr. et al. | |
| 6,163,097 A | 12/2000 | Smith et al. | |
| 6,163,137 A | 12/2000 | Wallace et al. | |
| 6,172,429 B1 | 1/2001 | Russell | |
| 6,177,735 B1 | 1/2001 | Chapman et al. | |
| 6,215,199 B1 | 4/2001 | Lysenko et al. | |
| 6,246,125 B1 | 6/2001 | Axtell | |
| 6,249,058 B1 | 6/2001 | Rea | |
| 6,278,197 B1 | 8/2001 | Appa | |
| 6,285,090 B1 | 9/2001 | Brutsaert et al. | |
| 6,327,994 B1 | 12/2001 | Labrador | |
| 6,359,401 B1 | 3/2002 | Garcia-Sinclair et al. | |
| 6,373,161 B1 | 4/2002 | Khalaf | |
| 6,392,371 B1 | 5/2002 | Cheng et al. | |
| 6,412,237 B1 | 7/2002 | Sahai | |
| 6,426,580 B1 | 7/2002 | Ikeda et al. | |
| 6,429,552 B2 | 8/2002 | Asao et al. | |
| 6,452,287 B1 | 9/2002 | Looker | |
| 6,476,513 B1 | 11/2002 | Gueorguiev | |
| 6,476,534 B1 | 11/2002 | Vanderbeck et al. | |
| 6,476,535 B1 | 11/2002 | Oohashi et al. | |
| 6,483,199 B2 | 11/2002 | Umemoto et al. | |
| 6,504,260 B1 | 1/2003 | Debleser | |
| 6,522,045 B2 | 2/2003 | Ikeda et al. | |
| 6,522,046 B2 | 2/2003 | Ikeda et al. | |
| 6,541,877 B2 | 4/2003 | Kim et al. | |
| 6,598,573 B2 | 7/2003 | Kobayashi | |
| 6,641,367 B1 | 11/2003 | Van der Klippe | |
| 6,661,146 B2 | 12/2003 | Oohashi et al. | |
| 6,664,704 B2 | 12/2003 | Calley | |
| 6,665,990 B1 | 12/2003 | Cody | |
| 6,693,409 B2 | 2/2004 | Lynch et al. | |
| 6,781,276 B1 | 8/2004 | Stiesdal et al. | |
| 6,794,777 B1 | 9/2004 | Fradella | |
| 6,794,781 B2 | 9/2004 | Razzell et al. | |
| 6,798,082 B1 | 9/2004 | Chen | |
| 6,800,956 B2 | 10/2004 | Bartlett | |
| 6,814,493 B2 | 11/2004 | Wobben | |
| 6,826,874 B2 | 12/2004 | Takeuchi et al. | |
| 6,833,633 B2 | 12/2004 | Wobben | |
| 6,836,028 B2 | 12/2004 | Northrup et al. | |
| 6,836,036 B2 | 12/2004 | Dube | |
| 6,841,892 B1 | 1/2005 | Le Nabour et al. | |
| 6,844,656 B1 | 1/2005 | Larsen et al. | |
| 6,849,965 B2 | 2/2005 | Le Nabour et al. | |
| 6,853,094 B2 | 2/2005 | Feddersen et al. | |
| 6,856,039 B2 | 2/2005 | Mikhail et al. | |
| 6,876,176 B2 | 4/2005 | Stefanovic et al. | |
| 6,891,302 B1 | 5/2005 | Gabrys | |
| 6,897,577 B2 | 5/2005 | Weeber et al. | |
| 6,903,466 B1 | 6/2005 | Mercier et al. | |
| 6,909,211 B2 | 6/2005 | Ciciliani et al. | |
| 6,911,741 B2 | 6/2005 | Pettersen et al. | |
| 6,921,243 B2 | 7/2005 | Canini et al. | |
| 6,929,671 B2 | 8/2005 | Kim et al. | |
| 6,943,461 B2 | 9/2005 | Kaploun | |
| 6,943,462 B2 | 9/2005 | Wobben | |
| 6,943,478 B2 | 9/2005 | Zepp et al. | |
| 6,946,750 B2 | 9/2005 | Wobben | |
| 6,954,004 B2 | 10/2005 | Skeist et al. | |
| 6,984,897 B2 | 1/2006 | Skeist | |
| 7,004,724 B2 | 2/2006 | Pierce et al. | |
| 7,011,598 B2 | 3/2006 | Flamang et al. | |
| 7,019,413 B2 | 3/2006 | Kinoshita | |
| 7,023,160 B2 | 4/2006 | Virtanen et al. | |
| 7,042,109 B2 | 5/2006 | Gabrys | |
| 7,042,110 B2 | 5/2006 | Mikhail et al. | |
| 7,042,128 B2 | 5/2006 | Zepp et al. | |
| 7,045,925 B2 | 5/2006 | Frager et al. | |
| 7,049,719 B2 | 5/2006 | Wobben | |
| 7,061,133 B1 | 6/2006 | Leijon et al. | |
| 7,075,192 B2 | 7/2006 | Bywaters et al. | |
| 7,081,696 B2 | 7/2006 | Ritchey | |
| 7,084,520 B2 | 8/2006 | Zambrano et al. | |
| 7,088,029 B2 | 8/2006 | Hiramatsu | |
| 7,098,551 B2 | 8/2006 | Wobben | |
| 7,105,941 B2 | 9/2006 | Hua | |
| 7,105,975 B2 | 9/2006 | Semones et al. | |
| 7,109,599 B2 | 9/2006 | Watkins | |
| 7,109,625 B1 | 9/2006 | Jore et al. | |
| 7,126,235 B2 | 10/2006 | Bernhoff et al. | |
| 7,135,952 B2 | 11/2006 | Harding | |
| 7,145,266 B2 | 12/2006 | Lynch et al. | |
| 7,154,191 B2 | 12/2006 | Jansen et al. | |
| 7,154,192 B2 | 12/2006 | Jansen et al. | |
| 7,154,193 B2 | 12/2006 | Jansen et al. | |
| 7,166,984 B1 | 1/2007 | Jones et al. | |
| 7,170,212 B2 | 1/2007 | Balson et al. | |
| 7,180,204 B2 | 2/2007 | Grant et al. | |
| 7,186,083 B2 | 3/2007 | Bayly | |
| 7,190,085 B2 | 3/2007 | Moehlenkamp | |
| 7,190,101 B2 | 3/2007 | Hirzel | |
| 7,205,678 B2 | 4/2007 | Casazza et al. | |
| 7,215,038 B2 | 5/2007 | Bacon | |
| 7,230,361 B2 | 6/2007 | Hirzel | |
| 7,231,743 B2 | 6/2007 | Takeuchi et al. | |
| 7,245,037 B2 | 7/2007 | Ängquist et al. | |
| 7,253,543 B2 | 8/2007 | Akiyama | |
| 7,289,329 B2 | 10/2007 | Chen et al. | |
| 7,291,956 B2 | 11/2007 | Itoh et al. | |
| 7,312,537 B1 | 12/2007 | Walling et al. | |
| 7,329,099 B2 | 2/2008 | Hartman | |
| 7,332,837 B2 | 2/2008 | Ward et al. | |
| 7,345,377 B2 | 3/2008 | Bacon | |
| 7,348,705 B2 | 3/2008 | Cai et al. | |
| 7,355,309 B2 | 4/2008 | Costin et al. | |
| 7,358,624 B2 | 4/2008 | Bacon | |
| 7,365,472 B2 | 4/2008 | Hiramatsu | |
| 7,372,174 B2 | 5/2008 | Jones et al. | |
| 7,375,449 B2 | 5/2008 | Butterfield | |
| 7,385,330 B2 | 6/2008 | Trzynadlowski et al. | |
| 7,414,331 B2 | 8/2008 | Datta | |
| 7,425,771 B2 | 9/2008 | Rivas et al. | |
| 7,437,264 B2 | 10/2008 | Pierce et al. | |
| 7,439,714 B2 | 10/2008 | Gonzalez et al. | |
| 7,446,435 B2 | 11/2008 | Zhang et al. | |
| 7,468,569 B2 | 12/2008 | Hirzel | |
| 7,478,777 B2 | 1/2009 | Wobben | |
| 7,482,720 B2 | 1/2009 | Gordon et al. | |
| 7,525,228 B2 | 4/2009 | Chuang et al. | |

(56) References Cited

U.S. PATENT DOCUMENTS

| | | | |
|---|---|---|---|
| 7,538,446 B2 | 5/2009 | Bonnet | |
| 7,545,052 B2 | 6/2009 | Gonzalez et al. | |
| 7,573,173 B1 * | 8/2009 | Frownfelter | 310/208 |
| 7,592,766 B2 | 9/2009 | Patel et al. | |
| 7,595,574 B2 | 9/2009 | Ritchey | |
| 7,612,463 B2 | 11/2009 | Cullen et al. | |
| 7,633,770 B2 | 12/2009 | Datta et al. | |
| 7,640,648 B1 | 1/2010 | Rittenhouse | |
| 7,646,126 B2 | 1/2010 | Trzynadlowski et al. | |
| 7,646,132 B2 | 1/2010 | Halstead | |
| 7,646,178 B1 | 1/2010 | Fradella | |
| 7,692,357 B2 | 4/2010 | Qu et al. | |
| 7,710,081 B2 | 5/2010 | Saban et al. | |
| 7,714,479 B2 | 5/2010 | Seneff et al. | |
| 7,723,891 B2 | 5/2010 | Rittenhouse | |
| 7,750,522 B2 | 7/2010 | Gizaw et al. | |
| 7,781,932 B2 | 8/2010 | Jansen | |
| 7,808,149 B2 | 10/2010 | Pabst et al. | |
| 7,816,833 B2 | 10/2010 | Nair | |
| 7,821,164 B2 | 10/2010 | Laskaris et al. | |
| 7,830,057 B2 | 11/2010 | Gieras | |
| 7,851,965 B2 | 12/2010 | Calley et al. | |
| 7,852,643 B2 | 12/2010 | Zhang et al. | |
| 7,888,839 B2 | 2/2011 | Gabrys et al. | |
| 7,919,879 B2 | 4/2011 | Flannery et al. | |
| 7,923,853 B2 | 4/2011 | Lewis | |
| 7,923,886 B2 | 4/2011 | Calley et al. | |
| 7,928,592 B2 | 4/2011 | Wagoner et al. | |
| 7,939,959 B2 | 5/2011 | Wagoner et al. | |
| 7,944,068 B2 | 5/2011 | Wagoner et al. | |
| 8,097,970 B2 | 1/2012 | Hyvarinen | |
| 8,115,348 B2 | 2/2012 | Hsu et al. | |
| 8,138,620 B2 | 3/2012 | Wagoner et al. | |
| 8,178,992 B1 | 5/2012 | Meller | |
| 8,217,533 B2 | 7/2012 | Jones et al. | |
| 8,373,307 B2 | 2/2013 | Sihler et al. | |
| 8,426,995 B2 | 4/2013 | Langel | |
| 2004/0021437 A1 | 2/2004 | Maslov et al. | |
| 2005/0120856 A1 | 6/2005 | Duford et al. | |
| 2006/0055265 A1 | 3/2006 | Zalusky | |
| 2006/0202584 A1 | 9/2006 | Jore et al. | |
| 2007/0152536 A1 | 7/2007 | Chuang et al. | |
| 2008/0088200 A1 | 4/2008 | Ritchey | |
| 2008/0100166 A1 | 5/2008 | Stahlhut et al. | |
| 2008/0100174 A1 | 5/2008 | Stahlhut et al. | |
| 2009/0295231 A1 | 12/2009 | Gaffney et al. | |
| 2011/0006600 A1 | 1/2011 | Fontana et al. | |
| 2011/0133461 A1 | 6/2011 | Hjort | |
| 2011/0241630 A1 | 10/2011 | Ritchey et al. | |
| 2011/0273048 A1 | 11/2011 | Jore et al. | |
| 2012/0104894 A1 | 5/2012 | Van Den Bossche et al. | |
| 2012/0155131 A1 | 6/2012 | Moreno-Castaneda et al. | |
| 2012/0175962 A1 | 7/2012 | Zhan et al. | |
| 2012/0200177 A1 | 8/2012 | Atkinson et al. | |
| 2012/0217746 A1 | 8/2012 | Groendahl et al. | |
| 2012/0217831 A1 | 8/2012 | Jore et al. | |
| 2012/0221159 A1 | 8/2012 | Olesen | |
| 2012/0243274 A1 | 9/2012 | Feng et al. | |
| 2013/0015703 A1 | 1/2013 | Rouse et al. | |

OTHER PUBLICATIONS

Wills, D., "Methods to Quantify and Reduce Rotor Losses in a Solid Rotor Yoke Permanent Magnet Machine," dated Mar. 2010.

* cited by examiner

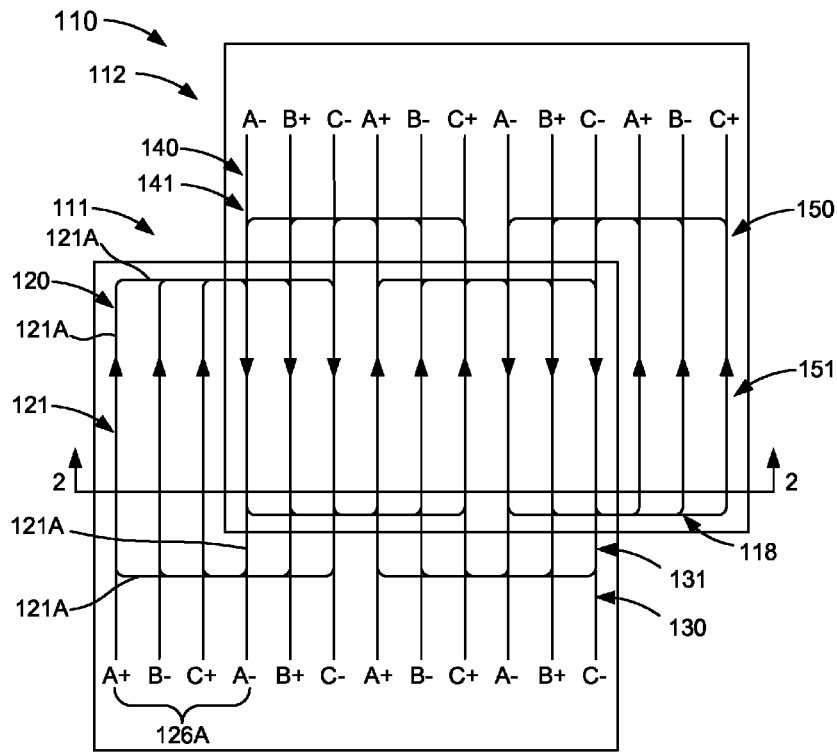
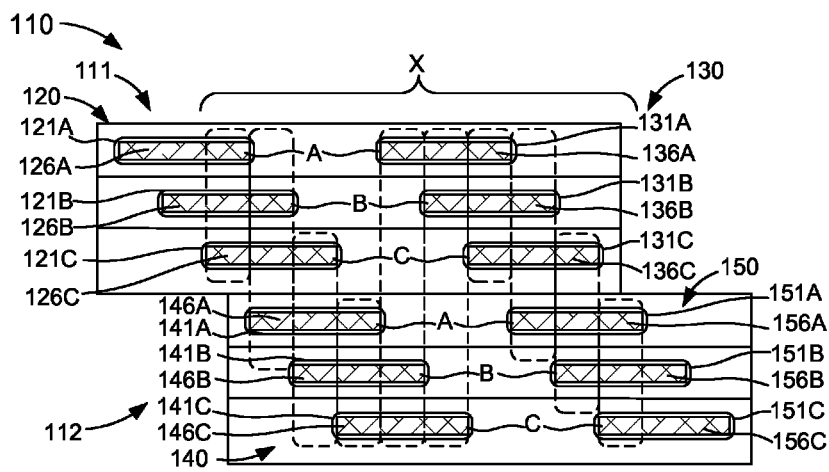

US 8,736,133 B1

METHODS AND APPARATUS FOR OVERLAPPING WINDINGS

BACKGROUND

Embodiments described herein relate generally to laminated composite assemblies containing electrical circuits and more particularly to methods and apparatus for overlapping windings of multi-circuit printed circuit boards.

Some known laminated composite assemblies (e.g., printed circuit boards) include multiple layers of selectively etched copper separated by a substantially uniform core material and/or dielectric material. The conductive layers of copper carry electrical current from, or induced by, a source to electronic devices in electrical communication with the conductive layers. For example, in some instances, the conductive layers of a printed circuit board can receive a flow of electrical current from a power source such as a battery, inverter, or power outlet. Such printed circuit boards can receive and/or transmit a flow of electrical current in a single phase or multiple phases.

In other instances, an electrical current can be induced on or along the conductive layers of a laminated composite assembly, such as, for example, by permanent magnets included in an electromagnetic machine. In some embodiments, a laminated composite assembly can be arranged within the electromagnetic machine to form a stator. In some instances, the phase and/or phases of the electrical current carried on the conductive layers of the laminated composite assembly can be varied between the layers. In some embodiments, the laminated composite assembly can include symmetrically wound machine coils that form symmetrically overlapping areas associated with each phase of the current. This symmetry helps to balance electromagnetic effects such as mutual inductance between phases.

In some embodiments, however, the use of a single laminated composite assembly to form a stator may be unfeasible (e.g., when used in a relatively large generator or motor such as, for example, wind powered turbine). In such embodiments, a number of laminated composite assemblies can be aligned to form a segmented stator. By forming a segmented stator from multiple adjacent laminated assemblies, an area of dead space defined by the "seam" between adjacent laminated assemblies produces unbalanced mutual inductance, which can cause significant electrical imbalance in the segmented stator.

Thus, a need exists for improved methods and apparatus for overlapping windings of one or more laminated composite assembly.

SUMMARY

In some embodiments, an apparatus includes a first winding portion, from a set of winding portions, which has a set of coils. Each coil of the first winding portion is associated with a different electrical phase from a set of electrical phases. Each coil of the first winding portion circumscribes a different area from a set of areas circumscribed by the set of coils of the first winding portion. A second winding portion has a set of coils associated with the set of electrical phases and a third winding portion has a set of coils associated with the set of electrical phases. The first winding portion is configured to at least partially overlap the second winding portion and the third winding portion such that each area from the set of areas is substantially circumscribed by a coil associated with each electrical phase from the set of electrical phases.

BRIEF DESCRIPTION OF THE DRAWINGS

FIG. 1 is a schematic illustration of a laminated composite assembly, according to an embodiment.

FIG. 2 is a schematic cross-sectional view of the laminated composite assembly taken along the line 2-2 in FIG. 1.

DETAILED DESCRIPTION

Figure 3:
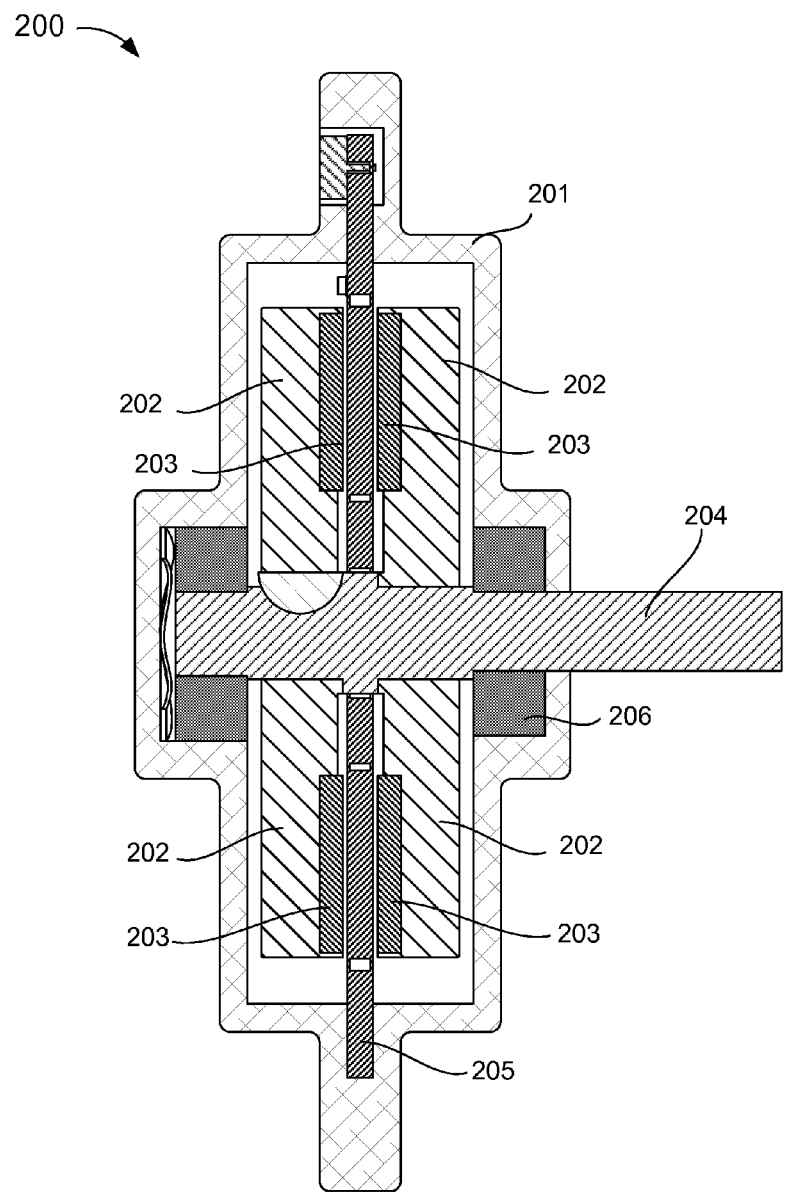
FIG. 3 is a schematic cross-sectional illustration of a laminated composite assembly used, for example, in a machine structure, according to an embodiment.

In some embodiments, an apparatus includes a first winding portion, from a set of winding portions, which has a set of coils. Each coil of the first winding portion is associated with a different electrical phase from a set of electrical phases. Each coil of the first winding portion circumscribes a different area from a set of areas circumscribed by the set of coils of the first winding portion. A second winding portion has a set of coils associated with the set of electrical phases and a third winding portion has a set of coils associated with the set of electrical phases. The first winding portion is configured to at least partially overlap the second winding portion and the third winding portion such that each area from the set of areas is substantially circumscribed by a coil associated with each electrical phase from the set of electrical phases.

In some embodiments, an apparatus (e.g., a laminated composite assembly) includes a set of winding portions. Each winding portion from the set of winding portions has a set of coils associated with a set of electrical phases. Each coil from the set of coils has an operative portion that facilitates current flow in a direction. Each winding portion from the set of winding portions substantially overlaps at least one remaining winding portion from the set of winding portions such that the operative portion of a coil from the set of coils on that winding portion associated with an electrical phase is substantially aligned with the operative portion of a coil from the set of coils on the at least one remaining winding portion associated with the electrical phase.

In some embodiments, an apparatus (e.g., a laminated composite assembly) includes a set of winding portions. Each winding portion from the set of winding portions has a set of coils. Each coil from the set of coils of each winding portion is associated with a different electrical phase from a set of electrical phases and circumscribes a different area from a set of areas circumscribed by that set of coils on the winding portion. Each winding portion substantially overlaps at least two remaining winding portions from the set of winding portions such that each area from the set of areas on each winding portion is circumscribed by a coil associated with each electrical phase from the set of electrical phases.

As used herein, the singular forms "a," "an" and "the" include plural referents unless the context clearly dictates otherwise. Thus, for example, the term "a coil" is intended to mean a single coil or a combination of coils, "a material" is intended to mean one or more materials, or a combination thereof.

As used herein, the term "set" can refer to multiple features or a singular feature with multiple parts. For example, when referring to set of coils, the set of coils can be considered as one coil with distinct portions, or the set of coils can be considered as multiple coils. Such a set of coils can include, for example, multiple portions that can be discontinuous from each other while being operatively coupled.

As used herein, the term "parallel" generally describes a relationship between two geometric constructions (e.g., two lines, two planes, a line and a plane or the like) in which the two geometric constructions are substantially non-intersecting as they extend substantially to infinity. For example, as used herein, a line is said to be parallel to another line when the lines do not intersect as they extend to infinity. Similarly, when a planar surface (i.e., a two-dimensional surface) is said to be parallel to a line, every point along the line is spaced apart from the nearest portion of the surface by a substantially equal distance. Two geometric constructions are described herein as being "parallel" or "substantially parallel" to each other when they are nominally parallel to each other, such as for example, when they are parallel to each other within a tolerance. Such tolerances can include, for example, manufacturing tolerances, measurement tolerances, or the like.

The embodiments described herein relate generally to conductive windings disposed on or included in a laminated composite assembly. As described in detail herein, a laminated composite assembly can be used to support a portion of an electronic circuit. For example, at least a portion of the laminated composite assembly (also referred to herein as "assembly") can form a portion of an integrated circuit (IC), a printed circuit board (PCB), a PCB assembly, an application-specific integrated circuit (ASIC), or any other suitable electronic circuit support structure. The assemblies described herein can include any suitable number of conducting layers that are separated by an electric insulator configured to limit an electromagnetic interference between the conducting layers. In other embodiments, the arrangements and methods described herein can be applied to, for example, wire-wound coils of an electromagnetic machine and/or iron-core electromagnetic machines.

FIGS. 1 and 2 are schematic illustrations of a laminated composite assembly 110 according to an embodiment. The laminated composite assembly 110 (also referred to herein as "assembly") includes a first winding portion 120, a second winding portion 130, a third winding portion 140, and a fourth winding portion 150 (collectively referred to herein as a "set of windings 118" or simply "windings 118"). More specifically, the laminated composite assembly 110 can include a first subassembly 111 that includes the first winding portion 120 and the second winding portion 130 and a second subassembly 112 that includes the third wind portion 140 and the fourth winding portion 150. The first subassembly 111 and the second subassembly 112 can be substantially similar in function and can be stacked and laminated together to form the assembly 110. As described in further detail herein, the arrangement of the first subassembly 111 relative to the second subassembly 112 can reduce phase imbalance within the assembly 110.

The first subassembly 111 and the second subassembly 112 of the assembly 110 can include multiple layers of conductors (e.g., windings 118) that are separated by an electric insulator (e.g., a noncore dielectric layer or a core). A core can form a base that supports and/or separates a first layer of conductors (e.g., disposed on a first surface of the core) from a second layer of conductors (e.g., disposed on a second surface of the core, opposite the first surface). The core can be, for example, a dielectric material that can selectively isolate (e.g., selectively prevent and/or limit electrical communication between) each of the one or more conducting layers. In some embodiments, the core can be a dielectric material such as, for example, FR-4 or the like. In other embodiments, the core can be formed from any suitable insulating material(s) such as, for example, fiberglass, cotton, or silicon and can be bound by any suitable resin material.

In some embodiments, a noncore dielectric layer can be disposed between the conductive layers and can be formed from a material that is substantially similar to, or the same as, the core material. In other embodiments, the noncore dielectric layer can be a different insulating material than the core. In some embodiments, the noncore dielectric layer can be formed from a material (e.g., a pre-preg material) that can be heated to flow into the space between conductors and allowed to cool and/or cure to form a substantially rigid (e.g., hardened) noncore dielectric layer. In some embodiments, the noncore dielectric layer and/or the core of the first subassembly 111 and the noncore dielectric layer and/or the core of the second subassembly 112 can be varied. For example, a degree of electrical isolation provided and/or defined by the electric insulating layers can be based on a voltage stress between the conductive layers (e.g., the windings 118) as described in U.S. patent application Ser. No. 13/799,998, filed on Mar. 13, 2013, entitled "Methods and Apparatus for Optimizing Structural Layout of Multi-Circuit Laminated Composite Assembly," (referred to henceforth as the '998 application) the disclosure of which is incorporated by reference herein in its entirety. Therefore, in some embodiments, the first subassembly 111 and the second subassembly 112 can each be a PCB including multiple conducting layers separated by electrically insulating layers that can be laminated together to form the assembly 110.

While the first subassembly 111 and the second subassembly 112 are described above as being a PCB (e.g., a laminated composite assembly) that are stacked and laminated together to form the assembly 110, in other embodiments, the first subassembly 111 and the second subassembly 112 can be portions of the same laminated composite assembly 110. For example, the first subassembly 111 and the second subassembly 112 can refer to a subset of layers of the assembly 110 (i.e., not necessarily formed from pre-manufactured, independent, or otherwise pre-defined PCBs).

The windings 118 can be, for example, conductive traces etched from a conductive sheet laminated to the core. More specifically, a conductive sheet on one or more outer surfaces of a core can be masked and the undesired portions of the conductive sheet can be etched away, thereby leaving the desired conductive traces. The windings 118 can be any suitable material such as, for example, copper, silver, aluminum, gold, zinc, tin, tungsten, graphite, conductive polymer, and/or any other suitable conductive material. In this manner, the windings 118 can carry a current in a given direction (e.g., associated with power distribution, a signal carrying information and/or induced by a magnetic source) along a length of the windings 118 (FIG. 1).

As described in further detail herein, the multiple layers of conductive traces forming a winding portion (e.g., the winding portion 120, the winding portion 130, the winding portion 140, and/or the winding portion 150) can be placed in electrical communication with one another by any suitable electrical interconnect (not shown in FIGS. 1 and 2). For example, in some embodiments, a first conductive layer of a winding portion can be placed in electrical communication with a second conductive layer of the winding portion by one or more electrical interconnects (e.g., vias or holes defined by the assembly 110 and/or a PCB having a conductive portion such as an annulus) such as those described in U.S. patent application Ser. No. 13/778,415, entitled "Methods and Apparatus for Optimizing Electrical Interconnects on Laminated Composite Assemblies," and filed on Feb. 27, 2013, the disclosure of which is incorporated herein by reference in its entirety. In such embodiments, the electrical interconnects can be blind vias, through hole vias, buried vias, and/or the like. As described in further detail herein, in some embodiments, a winding portion (e.g., the first winding portion 120 or the third winding portion 140) can be placed in electrical communication with another winding portion (e.g., the second winding portion 130 or the fourth winding portion 150, respectively) by one or more internal connections such as, for example, those described in the '998 application, the disclosure of which is incorporated herein above.

Each winding portion 120, 130, 140, and 150 of the set of winding portions 112 includes a set of coils 121, 131, 141, and 151, respectively. In some embodiments, each of the coils 121, 131, 141, and 151 can be, for example, a set of machine coils (e.g., one or more conductive traces disposed on one or more conductive layers and arranged in a coil of non-intersecting electrical paths). In such embodiments, the assembly 110 can be included in, for example, a segmented stator assembly of an electromagnetic machine such as a generator or motor. Thus, a rotor having one or more magnets (e.g., permanent magnets) can be moved relative to the segmented stator to induce an electric field (i.e., a voltage) in or on the coil 121 of the first winding portion 120, the coil 131 of the second winding portion 130, the coil 141 of the third winding portion 140, and/or the coil 151 of the fourth winding portion 150.

Each winding portion 120, 130, 140, and 150 of the windings 118 can include at least one coil from the set of coils 121, 131, 141, and 151, respectively, which is associated with an electrical phase. For example, as shown in FIGS. 1 and 2, the coils 121 of the first winding portion 120 can be arranged as a three-phase winding, including a first coil 121A associated with an electrical phase A, a second coil 121B associated with an electrical phase B, and a third coil 121C associated with an electrical phase C. Similarly, the coils 131 of the second winding portion 130 can include a first coil 131A associated with the electrical phase A, a second coil 131B associated with the electrical phase B, and a third coil 131C associated with the electrical phase C; the coils 141 of the second winding portion 140 can include a first coil 141A associated with the electrical phase A, a second coil 141B associated with the electrical phase B, and a third coil 141C associated with the electrical phase C; and the coils 151 of the second winding portion 150 can include a first coil 151A associated with the electrical phase A, a second coil 151B associated with the electrical phase B, and a third coil 151C associated with the electrical phase C. Although the winding portions 120, 130, 140, and 150 are described as including coils associated with one of three phases, in other embodiments, the winding portions 120, 130, 140, and 150 can include any number of coils associated with any number of phases (e.g., two phases, four phases, five phases, or more). Each coil from the set of coils of a winding portion (e.g., the coils 121A, 121B, and 121C from the set of coils 121 of the first winding portion 120) can be disposed on different layers and can be offset by a given distance that can be associated with a phase angle. For example, in the case of a three-phase winding portion as described above, the spacing of the coils can be such that as the coils are exposed to a magnetic field, a voltage induced in adjacent coils is separated by a phase angle of substantially 120°. For example, the first coil 121A associated with phase A can carry a voltage that is offset from a voltage carried by the second coil 121B associated with phase B by a phase angle of substantially 120°. Similarly, the second coil 121B associated with phase B can carry the voltage that is offset from a voltage carried by the third coil 121C associated with phase C by the phase angle of substantially 120°, as described in further detail herein. In this manner, each coil associated with a given phase substantially circumscribes an area (e.g., a magnetic flux carrying area) that is associated with the given phase. Moreover, at least a portion of the area circumscribed by a coil overlaps the areas circumscribed by the remaining coils of the winding portion. For example, as shown in FIGS. 1 and 2, the first coil 121A included in the coils 121 of the first winding portion 120 circumscribes an area 126A (e.g., the area 126A bounded by the first coil 121A as shown in FIG. 1) that is associated with the phase A, the second coil 121B circumscribes an area 126B that is associated with the phase B (e.g., the area 126B similarly bounded by the second coil 121B though, for simplicity, not shown in FIG. 1), and the third coil 121C circumscribes an area 126C that is associated with the phase C (e.g., the area 126C similarly bounded by the third coil 121C though, for simplicity, not shown in FIG. 1). Expanding further, while the coils 121A, 121B, 121C are represented in FIGS. 1 and 2 as a single turn of a coil, the coils 121A, 121B, and 121C can be formed from any number of substantially concentric coils. The lines of FIGS. 1 and 2 associated with the coils 121A, 121B, and 121C are, therefore, representative of a centerline of the coils 121A, 121B, and 121C. Thus, a portion of the areas 126A, 126B, and 126C substantially circumscribed by the coils 121A, 121B, and 121C, respectively, can include a portion of the coils 121A, 121B, and 121C, respectively.

Similarly, the first coil 131A included in the coils 131 of the second winding portion 130 circumscribes an area 136A that is associated with the phase A, the second coil 131B circumscribes an area 136B that is associated with the phase B, and the third coil 131C circumscribes an area 136C that is associated with the phase C; the first coil 141A included in the coils 141 of the third winding portion 140 circumscribes an area 146A that is associated with the phase A, the second coil 141B circumscribes an area 146B that is associated with the phase B, and the third coil 141C circumscribes an area 146C that is associated with the phase C; and the first coil 151A included in the coils 151 of the fourth winding portion 150 circumscribes an area 156A that is associated with the phase A, the second coil 151B circumscribes an area 156B that is associated with the phase B, and the third coil 151C circumscribes an area 156C that is associated with the phase C.

As shown in FIGS. 1 and 2, the first winding portion 120 and the second winding portion 130 can be separated by a distance and the third winding portion 140 and the fourth winding portion 150 can be separated by the same distance. For example, in some embodiments, the distance defined between an operative portion (e.g., a portion in which voltage is induced when the laminated composite assembly 110 is exposed to an alternating magnetic field as described with respect to FIG. 3) of the coil 121C (e.g., aligned with "C−" in FIG. 1) and an operative portion of the coil 131A (e.g., aligned with "A+" in FIG. 1) can be associated with a distance substantially equal to one third of a magnetic pole (one magnetic pole being a distance between, for example, "A+" and "A−" in FIG. 1). Furthermore, in some embodiments, an operative portion of the first coil 121A of the first winding portion 120 can be separated from an operative portion of the first coil 131A of the second winding portion 130 by a distance between two operative portions of a single coil such as, for example, between an operative portion of coil 121A aligned with "A+" and an operative portion of coil 121A aligned with "A−" (e.g., substantially equal to the distance of one magnetic pole), as described in further detail herein. As shown in FIG. 2, the separation of the first coil 121A and the second coil 131A is such that an area defined therebetween is not circumscribed by either coil 121A or 131A associated with Phase A on the subassembly 111. Expanding further, when viewed in isolation from the other winding portions, the first winding portion 120 includes two areas that are substantially circumscribed by one phase (i.e., an area circumscribed by the coil 121A but not the coil 121B and/or the coil 121C, and an area circumscribed by the coil 121C but not the coil 121A and/or the coil 121B); two areas circumscribed by two electrical phases (i.e., an area circumscribed by the coils 121A and 121B but not the coil 121C, and an area circumscribed by the coils 121B and 121C but not the coil 121A); and one area circumscribed by three electrical phases (i.e., an area circumscribed by the coils 126A, 126B, and 126C. The second winding portion 130, the third winding portion 140, and the fourth winding portion 150 are similarly arranged.

As shown in FIG. 1, the arrangement of the first subassembly 111 and the second subassembly 112 is such that the operative portion of a coil on the first subassembly 111 is overlapped by a corresponding operative portion of a coil on the second subassembly 112. For example, an operative portion of the first coil 121A of the first winding portion 120 is overlapped by a corresponding operative portion of the first coil 141A of the third winding portion 140. Therefore, a coil of the second subassembly 112 (e.g., 141A in FIG. 2) can be offset from a coil of the first subassembly 111 (e.g., 121A in FIG. 2) by one magnetic pole such that the polarity of the coil of the second subassembly 112 can be opposite the polarity of the coil of the first subassembly 111 (i.e., mirrored). Thus, a current that is carried on the first coil 121A of the first winding portion 120 and a current that is carried on the first coil 141A of the third winding portion 140 flows in a substantially similar direction (shown as arrows in FIG. 1). Moreover, while the first subassembly 111 and the second subassembly 112 are shown in FIG. 1 as having terminals on opposing sides of the windings 118 (shown on opposing sides for clarity), the first subassembly 111 and the second subassembly 112 can otherwise each be electrically coupled to similar terminals (e.g., connecting a plurality of positive terminals to a single connection and/or connecting a plurality of negative terminals to a single connection).

In this manner, when viewed in isolation the first subassembly 111 including the first winding portion 120 and the second winding portion 130 is symmetrically arranged (e.g., the coils are evenly spaced) yet is electrically phase imbalanced (e.g., each area circumscribed by a coil is not circumscribed by coils of the three phases) and the second subassembly 112 including the third winding portion 140 and the fourth winding portion 150 is symmetrically arranged yet is electrically phase imbalanced. Thus, by stacking the first subassembly 111 and the second subassembly 112 at an offset substantially equal to the distance of one magnetic pole, the first subassembly 111 and the second subassembly 112 can collectively define a set of areas X (e.g., the areas indicated by the dashed lines in FIG. 2) that are symmetrically arranged and that are substantially circumscribed within one coil associated with all three phases. Such an arrangement can reduce voltage imbalance produced by the different phases in the laminated composite assembly 110.

While not shown in FIGS. 1 and 2, in some embodiments, any number of assemblies 110 can be disposed adjacent to one another to form, for example, a segmented stator. In such embodiments, the offset of the second subassembly 112 relative to the first subassembly 111 forms a shoulder that can matingly couple to an adjacent assembly (not shown). In some embodiments, the assemblies 110 can be arranged in a substantially annular manner and disposed about a common axis. In other embodiments, the assemblies 110 can be arranged in a substantially linear manner. By placing the assemblies 110 adjacent to one another, each area that is circumscribed by at least one coil can be circumscribed by a coil associated with the three phases, respectively. Furthermore, adjacent assemblies 110 define a dead space that is formed by a seam between the two assemblies 110 (e.g., the winding portions are offset from the edge of the first subassembly 111 and the second subassembly 112). The dead space formed at least in part by the seam can be substantially equal to or less than the space between the winding portions on the same subassembly. For instance, the coil 121C has an outermost edge portion that is closest to of the second winding portion 130, substantially equal to the centerline location plus half the width of the coil 121C. The coil 131A has a similar outermost edge portion that is closest to the first winding portion 120, substantially equal to the centerline location plus half the width of the coil 131A. A distance defined between the outermost edge portions of the coils 121C and 131A can be representative of a seam dimension between adjacent assemblies 110, or can alternatively be greater than the seam dimension if the seam is otherwise filled with additional insulation material in that area. Said another way, a distance defined between an edge of the coil 121A (e.g., the outermost coil) of a first assembly 110 and an edge of the coil 131C (e.g., the outermost coil) of an adjacent assembly 110 (not shown) can define dead space.

In some embodiments, the dead space can be associated with a distance defined between the coil 121C of the first winding portion 120 and the coil 131A of the second winding portion 130, described above. More specifically, the offset of each coil can be based, at least partially, on a space formed by the seam of adjacent assemblies 110. For example, the space defined on the first subassembly 111 between the first coil 121A of the first winding portion 120 and the first coil 131A of the second winding portion 130 can be substantially equal to a space that would be formed between a coil (e.g., the first coil 121A) of the first subassembly 111 and a corresponding coil of an adjacent first subassembly (not shown in FIGS. 1 and 2). Thus, a set of assemblies 110 can be arranged to form a segmented stator that is substantially symmetrical and is substantially phase balanced.

Although the coils are shown in FIGS. 1 and 2 as being disposed on a single layer, in some embodiments, portions of a coil included in a winding portion can be disposed on multiple layers, as described, for example, in the '998 application, which is incorporated herein by reference above. For example, as described in further detail herein, a coil can include an operative portion that can be disposed on more than one layer and electrically coupled by an electrical interconnect (e.g., a via or the like). In some embodiments, a coil can include end turns that are disposed on a layer. In such embodiments, the arrangement of a coil distributed on multiple layers and in electrical communication by one or more electrical interconnect can avoid overlapping conductive traces that would otherwise occur on the winding portion, as described in further detail herein. Additionally, as described in further detail herein, in some embodiments, a portion of a coil associated with a first phase can be disposed on a layer including a portion of a coil associated with a second phase and/or a coil associated with a third phase. For example, in some embodiments, an operative portion of each coil can be disposed on a common layer.

Any of the embodiments described herein can be included in an electromagnetic machine such as, for example, an axial flux, radial flux, transverse flux, or linear machine. The electromagnetic machine can be operated as a motor and/or a generator. For example, FIG. 3 is a cross-sectional illustration of an axial flux machine structure 200 according to an embodiment. In some embodiments, the machine structure 200 can be included in a wind turbine or the like.

The machine structure 200 includes a housing 201, a rotor assembly 202, and an annular segmented stator assembly 205. The housing 201 substantially encloses the rotor assembly 202 and the segmented stator assembly 205. The segmented stator assembly 205 can be coupled to the housing 201 such that the segment stator assembly 205 remains in a substantially fixed position within the housing 201. The segmented stator assembly 205 can include or support, for example, an air core type stator to support a set of conductive windings. For example, the segmented stator assembly 205 can include any number of stator portions that can be substantially similar to stator portions described in U.S. Patent Application Publication No. 2011/0273048, the disclosure of which is incorporated herein by reference in its entirety. Each stator portion can include at least one laminated composite assembly (e.g., at least one PCB), such as, for example, those described herein. In some embodiments, the laminated composite assemblies can be similar to those described in U.S. Pat. No. 7,109,625, the disclosure of which is incorporated herein by reference in its entirety. In this manner, the laminated composite assemblies that form the segmented stator assembly 205 can be arranged as described herein to limit phase to phase voltage imbalance, as described in further detail herein.

The rotor assembly 202 can include multiple rotor elements or portions that can be coupled together to form the rotor assembly 202. For example, in some embodiments, the rotor assembly 202 can include rotor portions similar to those described in U.S. patent application Ser. Nos. 13/568,791 and 13/152,164, the disclosures of which are incorporated herein by reference in their entireties. The rotor assembly 202 is coupled to a drive shaft 204 that is at least partially disposed within a set of bearings 206. Therefore, the drive shaft 204 can be rotated relative to the housing 201 (e.g., either directly or indirectly by a mechanical force). Moreover, with the rotor assembly 202 coupled to the drive shaft 204, the rotor assembly 202 is rotated with the drive shaft 204. Thus, the rotor assembly 202 can rotate relative to the stator assembly 205.

The rotor assembly 202 supports and/or is coupled to a set of magnetic assemblies 203. In some embodiments, the magnetic assemblies 204 can be similar to those described in U.S. patent application Ser. Nos. 13/692,083, 13/437,639, and 13/438,062, the disclosures of which are incorporated herein by reference in their entireties. In this manner, as the rotor assembly 202 is rotated relative to the segmented stator assembly 205, a magnetic flux flows between the poles of the magnetic assemblies 203. Thus, an electric field is induced in or on the conductive windings of the segmented stator assembly 205 (e.g., the operative portions of the conductive windings of the laminated composite assemblies such as, for example, the machine coils 121, 131, 141, and 151 described above with reference to FIGS. 1 and 2) that when properly gathered and delivered allows the machine structure 200 to behave as a generator or alternator. Conversely, an application of an electrical current to the conductive material of the segmented stator assembly 205 produces Lorentz forces between the flowing current and the magnetic field of the magnetic assemblies 203. The resultant force is a torque that rotates rotor assembly 202. Thus, the drive shaft 204 is rotated thereby doing work. In this manner, the machine structure 200 can behave as a motor or actuator. Moreover, the space defined by a coil of a first stator segment and a coil of a second, adjacent stator segment (as described below) can dictate the spacing of the coils of the laminated composite assemblies forming the segmented stator 205 and/or the arrangement of the magnetic assemblies 203 of the rotor assembly 202 to limit phase to phase voltage imbalance, as described in further detail herein.

Figure 4:
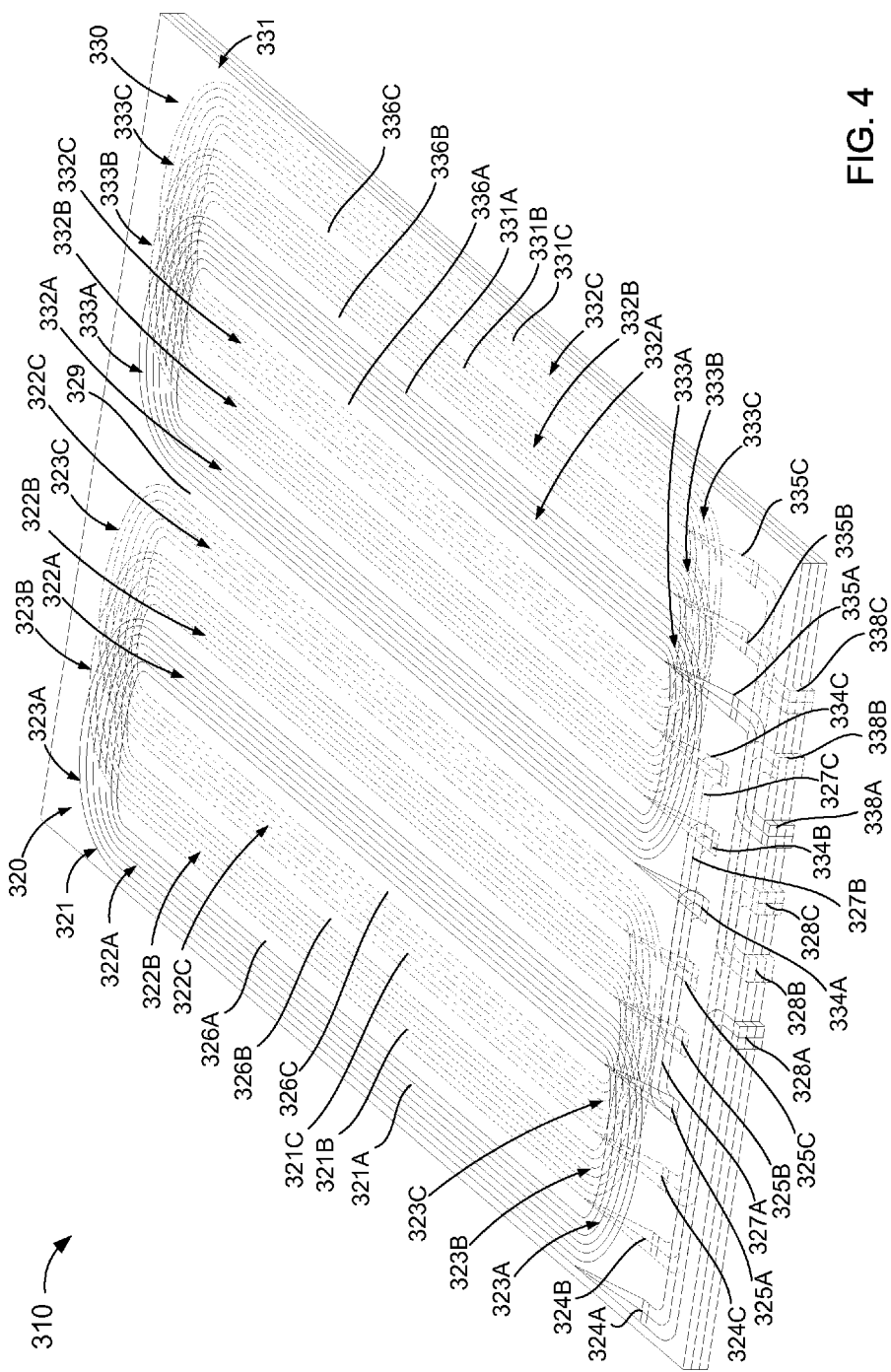
FIG. 4 is a schematic illustration of a laminated composite assembly, according to an embodiment.
Figure 5:
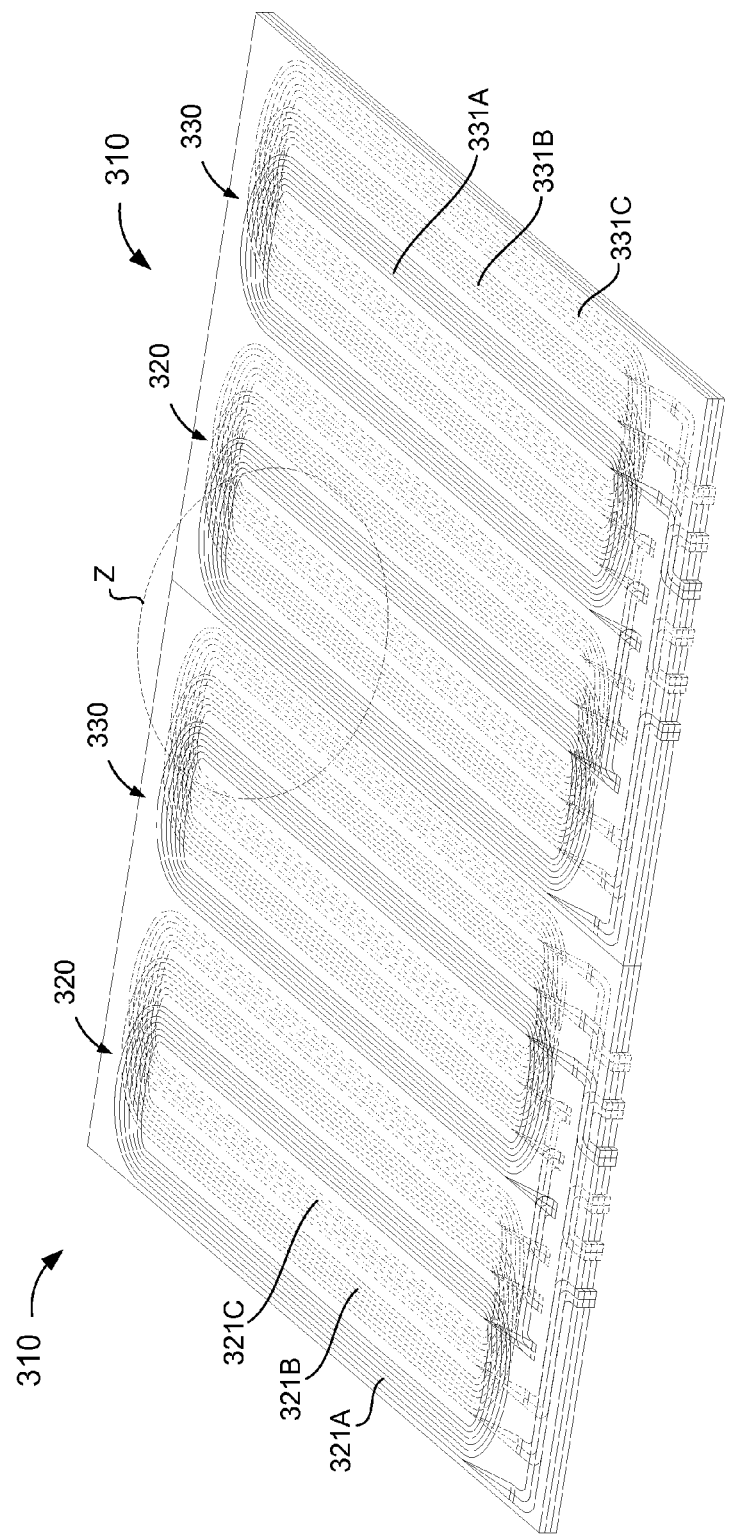
FIG. 5 is a schematic illustration of two of the laminated composite assemblies of FIG. 4, disposed adjacent to each other.
Figure 6:
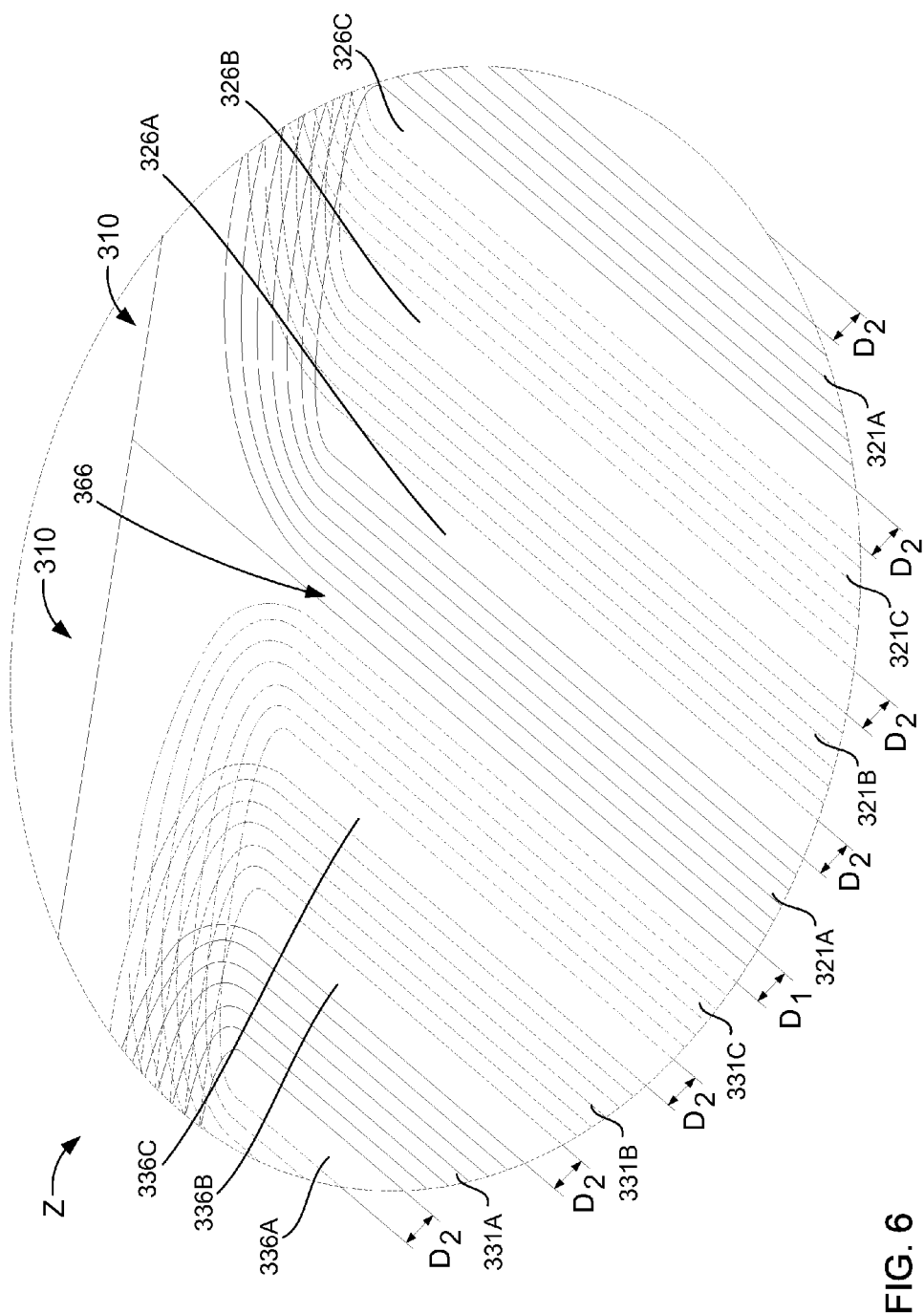
FIG. 6 is an enlarged view of a portion of the adjacent laminated composite assemblies indentified in FIG. 5 by the region $Z_1$.

FIGS. 4-6 are schematic illustrations of a laminated composite assembly 310 according to an embodiment. The laminated composite assembly 310 (also referred to herein as "assembly") can be included in an electromagnetic machine such as, for example, the machine structure 300 described above with reference to FIG. 3. The assembly 310 includes a first winding portion 320 and second winding portion 330. As shown, the assembly 310 can be formed from any number of layers. More specifically, the assembly 310 can be formed from any number of conducting layers that are separated by a corresponding number of electrical insulators (e.g., insulating layers such as, noncore dielectric layers, cores, or pre-preg layers). The insulating layers can be any suitable configuration. For example, the insulating layers can be substantially similar to, or the same as, the noncore dielectric layers and/or the cores, described above with reference to FIGS. 1 and 2. Thus, the insulating layers can provide a base for the conducting layers of the assembly 310 as well as provide a degree of electrical isolation between adjacent conducting layers.

As shown in FIG. 4, the first winding portion 320 and the second winding portion 330 can be conductive traces etched from a conducting sheet of the assembly 310 (as described above). The first winding portion 320 and the second winding portion 330 are each arranged in nonintersecting coils of conductive traces. More specifically, the first winding portion 320 includes a set of coils 321 that has a first coil 321A, a second coil 321B, and a third coil 321C and the second winding portion 330 includes a set of coils 331 that has a first coil 331A, a second coil 331B, and a third coil 331C. The first coil 321A of the first winding portion 320 has a first end portion 324A, a second end portion 325A, an operative portion 322A, and end turns 323A. The first end portion 324A is electrically coupled to a terminal 328A and the second end portion 325A is electrically coupled to an internal connection 327A (e.g., similar to or the same as those described in the '998 application. The operative portion 322A extends between the first end portion 324A, the second end portion 325A, and/or the end turns 323A and facilitates a current flow in a given direction, as described in further detail herein.

In a similar manner, the second coil 321B of the first winding portion 320 includes a first end portion 324B that is electrically coupled to a terminal 338B, a second end portion 325B that is electrically coupled to an internal connection 327B, an operative portion 322B, and end turns 323B; the third coil 321C of the first winding portion 320 includes a first end portion 324C that is electrically coupled to a terminal 328C, a second end portion 325C that is electrically coupled to an internal connection 327C, an operative portion 322C, and end turn 323C; the first coil 331A of the second winding portion 330 includes a first end portion 334A that is electrically coupled to the internal connection 327A, a second end portion 335A that is electrically coupled to a terminal 338A, an operative portion 332A, and end turn 333A; the second coil 331B of the second winding portion 330 includes a first end portion 334B that is electrically coupled to the internal connection 327B, a second end portion 335B that is electrically coupled to a terminal 328B, an operative portion 332B, and end turn 333B; and the third coil 331C of the second winding portion 330 includes a first end portion 334C that is electrically coupled to the internal connection 327C, a second end portion 335C that is electrically coupled to a terminal 338C, an operative portion 332C, and end turn 333C.

As described in further detail herein, the first coil 321A of the first winding portion 320 and the first coil 331A of the second winding portion 330 can be associated with a first electrical phase, the second coil 321B of the first winding portion 320 and the second coil 331B of the second winding portion 330 can be associated with a second electrical phase, and the third coil 321C of the first winding portion 320 and the third coil 331C of the second winding portion 330 can be associated with a third electrical phase. Moreover, the terminals 328A, 338B and 328C can be associated with a positive termination of a phase and the terminals 338A, 328B, and 338C can be associated with a negative termination of a phase. Therefore, by electrically coupling the second coil 321B of the first winding portion 320 to the terminal 338B and the second coil 331B of the second winding portion 330 to the terminal 328B, the set of terminals 328A, 328B, and 328C can be appropriately associated with the three phases (e.g., phase A, phase B, and phase C) as they relate to a 120° electrical phase shift, and, similarly, the set of terminals 338A, 338B, and 338C can be appropriately associated with the three phases as they relate to a 120° electrical phase shift (described above). While the terminals 328A, 328B, 328C, 338A, 338B, and 338C are shown as being particularly arranged and/or grouped, in other embodiments, the terminals 328A, 328B, 328C, 338A, 338B, and 338C can be arranged in any suitable manner while retaining the same function of the assembly 310. While the coils 321 and 331 are described above as being associated with three phases, in other embodiments, the first winding portion 320 and the second winding portion 330 can include any number of coils associated with any number of electrical phases in a similar manner as described.

In some embodiments, each coil from the set of coils of a winding portion (e.g., the coils 321A, 321B, and 321C from the set of coils 321 of the first winding portion 320) can be disposed on different layers and the coils can be offset by a given distance such that a voltage induced in an operative portion of the coils is associated with a phase angle. By way of example, the first coil 321A associated with the first phase can be separated from the second coil 321B associated with second phase by a distance associated with a phase angle of 120° and the second coil 321B associated with second phase can be separated from the third coil 321C associated with third phase by the distance associated with the phase angle of 120°. In this manner, each coil associated with a given phase substantially circumscribes an area (e.g., a magnetic flux carrying area) that is associated with the given phase. Moreover, at least a portion of the area circumscribed by a coil overlaps at least a portion of the areas circumscribed by the remaining coils of the winding portion. For example, as shown in FIG. 4, the first coil 321A included in the coils 321 of the first winding portion 320 circumscribes an area 326A that is associated with the first phase, the second coil 321B circumscribes an area 326B that is associated with the second phase, and the third coil 321C circumscribes an area 326C that is associated with the third phase. Similarly, the first coil 331A included in the coils 331 of the second winding portion 330 circumscribes an area 336A that is associated with the first phase, the second coil 331B circumscribes an area 336B that is associated with the second phase, and the third coil 331C circumscribes an area 336C that is associated with the third phase.

In some embodiments, portions of each coil included in the set of coils 321 of the first winding portion 320 and/or portions of each coil included in the set of coils 331 of the second winding portion 330 can be disposed on multiple layers such as described in U.S. Pat. No. 7,109,625, issued Sep. 19, 2006, entitled "Conductor Optimized Axial Field Rotary Energy Device," the disclosure of which is incorporated by reference herein in its entirety. For example, the assembly 310 can have one or more layers of the first winding portion 320 that include the operative portion 322A of the first coil 321A, the operative portion 322B of the second coil 321B, and/or the operative portion 321C of the third coil 321C. Similarly, the assembly 310 can have one or more layers of the first winding portion 320 that include the end turns 323A of the first coil 321A, the end turns 323B of the second coil 321B, or the end turns 323C of the third coil 321C. More specifically, the end turns 323A, 323B, and 323C can each be disposed on multiple layers but any given layer of the assembly 310 includes only one of the end turns 323A, 323B, or 323C. Thus, the end turns of the coils 321 do not intersect on a layer of the assembly 310. The layers associated with the operative portions of the coils 321 can be electrically coupled to one another and/or to the corresponding end turn portions of the coils 321 by vias and/or other suitable electrical interconnect(s). In this manner, the operative portions of the coils 321 of the first winding portion 320 can facilitate current flow in a given direction. For example, current can flow in a first direction on a first side of the operative portion 322A and can turn along the end turn 323A to flow in a second direction, substantially opposite the first direction, on a second side of the operative portion 322A. The second winding portion 330 is arranged in a similar manner and thus, is not described in detail herein.

As described above, one or more of the layers of the assembly 310 can include only the end turns, the terminal traces, and/or the internal connections of the coils 321 that would otherwise intersect another portion of the coils 321. For example, as shown in FIG. 4, the second end portion 325A of the first coil 321A runs in a transverse direction across the end turn 323A. Therefore, in some embodiments, the end turns 323A can be disposed on a different layer of the assembly 310 than the second end portion 325A. In a similar manner, the internal connection 327A, 327B, and 327C can each be disposed on a different layer of the assembly 310 than the second end portions 325A, 325B, and 325C of the coils, respectively. Thus, the conductive layers of the assembly 310 can be arranged to avoid intersections that would otherwise occur between the conductive traces. Furthermore, by spacing the coils at the distance, the operative portion of the coils do not overlap. In this manner, the operative portions of each coil can be disposed on the same layers. In some embodiments, the operative portions of the coils can be disposed on substantially all the layers of the assembly 310.

The internal connection 327A, 327B and 327C can be any suitable configuration and can be arranged to place the first winding portion 320 in electrical communication with the second winding portion 330. For example, as shown in FIG. 4, the internal connection 327A is an internal bus bar formed from one or more conductive traces that is electrically coupled to the second end portion 325A of the first coil 321A included in the first winding portion 320 and is electrically coupled to the first end portion 334A of the first coil 331A included in the second winding portion 330. Thus, a flow of current associated with the first phase can flow from the first coil 321A of the first winding portion 320 to the first coil 331A of the second winding portion 330. Furthermore, with the first end portion 324A of the first coil 321A of the first winding portion 320 electrically coupled to the terminal connection 328A and with the second end portion 335A of the first coil 331A of the second winding portion 330 electrically coupled to the terminal connection 338A, the terminal connections 328A and 338A, the first coils 321A and 331A, and the internal connection 327A form an electrical circuit between the terminal connections 328A and 338A.

As described above, the coils 321 of the first winding portion 320 each substantially circumscribe an area (e.g., the areas 326A, 326B, and 326C) that is associated with the corresponding phase and the coils 331 of the second winding portion 330 each circumscribe an area (e.g., the areas 336A, 336B, and 336C) that is associated with the corresponding phase. Expanding further, when viewed in isolation from other winding portions the first winding portion 320 includes two areas that are circumscribed by one phase (i.e., an area circumscribed by the coil 321A but not the coils 321B and 321C, and an area circumscribed by the coil 321C but not the coil 321A and 321B); two areas circumscribed by two electrical phases (i.e., an area circumscribed by the coils 321A and 321B but not the coil 321C, and an area circumscribed by the coils 321B and 321C but not the coil 321A); and one area circumscribed by three electrical phases (i.e., an area circumscribed by the coils 321A, 321B, and 321C). The second winding portion 330 is similarly arranged.

As shown in FIG. 4, the first winding portion 320 and the second winding portion 330 are separated by a distance (e.g., a distance defined between a centerline of the operative portion 322A of the coil 321A and a centerline of the operative portion 332A of the coil 331A). In some embodiments, the distance can be associated with an offset of two magnetic poles. By way of example, the operative portion 322A of the first coil 321A of the first winding portion 320 can be separated from the operative portion 332A of the first coil 331A of the second winding portion 330 by a width of two operative portions of the coils 321A or 331A, as described in further detail herein. The separation of the first winding portion 320 and the second winding portion 330 on the assembly 310 is such that an area defined therebetween is not circumscribed by an electrical phase. For example, as shown in FIG. 4, an area 329 defined between the third coil 321C of the first winding portion 320 and the first coil 331A of the second winding portion 330 on the assembly 310 is not circumscribed by an electrical phase, as described in further detail herein.

Any number of assemblies 310 can be disposed adjacent to one another to form a segmented stator. For example, FIG. 5 is an illustration of two adjacent assemblies 310. In some embodiments, the adjacent assemblies 310 can be placed in physical contact with one another. In other embodiments, the adjacent assemblies 310 can be disposed within a machine structure (e.g., the machine structure 300) such that a relatively small distance is defined therebetween. In such embodiments, the space can allow for variation in assembly dimensions, electrical insulation, and/or a degree of thermal expansion during use. As shown in FIG. 6, when the assemblies 310 are disposed adjacent to one another, an area 366 is formed between the third coil 331C of the second winding portion 330 on the first assembly 310 (e.g., the left assembly 310 in FIG. 6) and the first coil 321A of the first winding portion 320 on the second assembly 310 (e.g., the right assembly 310 in FIG. 6). Expanding further, the third coil 331C of the second winding portion 330 is spaced a distance from the edge of the assembly 310 on which it is disposed and the first coil 321A of the first winding portion 320 is spaced the distance from the edge of the assembly 310 on which it is disposed. In this configuration, the area 366 defined between the third coil 331C on the first assembly 310 and the first coil 321A on the second assembly 310 is an area that is not associated with an electrical phase (as described above).

As shown in FIG. 6, the area 366 is associated a distance $D_1$ (e.g., a linear distance and/or an angular distance) between the third coil 331C of the second winding portion 330 on the first assembly 310 and the first coil 321A of the first winding portion 320 on the second assembly 310. The arrangement of the assemblies 310 can be such that each distance $D_2$ between the operative portions of adjacent coils substantially corresponds to the distance $D_1$ associated with the area 366. For example, the distance $D_2$ defined between each coil on the first assembly 310 (including the distance associated with the area 329 (FIG. 4) between the first winding portion 320 and the second winding portion 330) is substantially the same as the distance $D_1$. Similarly stated, the distance $D_2$ between the operative portions of each adjacent coil on the assemblies 310 is at least partially based on the distance $D_1$ associated with the area 366. Thus, the adjacent assemblies 310 can have a high degree of symmetry yet remain relative phase imbalanced (e.g., with areas circumscribed by zero phases, one phase, two phases, and three phases per assembly). Thus, one or more offsetting assemblies can be arranged (e.g., stacked against) relative assemblies 310 that can reduce the phase imbalance.

Figure 7:
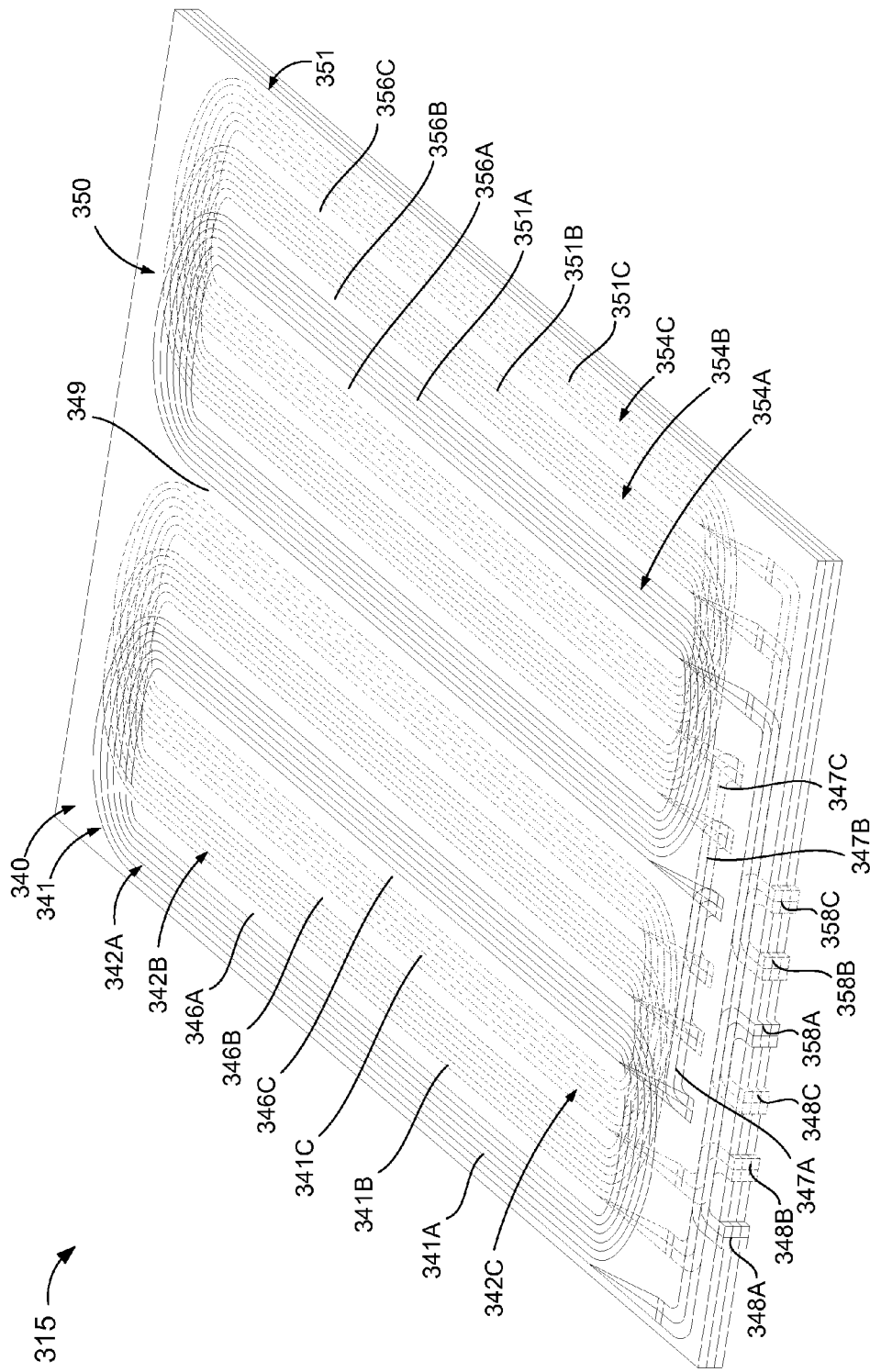
FIG. 7 is a schematic illustration of a second laminated composite assembly, according to an embodiment.

For example, FIG. 7 is an illustration of an offsetting assembly 315. The offsetting assembly 315 can be substantially similar in form and function to the assembly 310 described above. In this manner, portions of the offsetting assembly 315 are not described in further detail herein. The offsetting assembly 315 includes a first winding portion 340 and a second winding portion 350. The first winding portion 340 and the second winding portion 350 are each arranged in nonintersecting coils of conductive traces. More specifically, the first winding portion 340 includes a set of coils 341 that has a first coil 341A, a second coil 341B, and a third coil 341C and the second winding portion 350 includes a set of coils 351 that has a first coil 351A, a second coil 351B, and a third coil 351C. The first coil 341A of the first winding portion 340 has an operative portion 342A that extends between end turns, as described above with reference to the assembly 310. The first coil 341A includes a first end portion that is electrically coupled to a terminal 358A and a second end portions that is electrically coupled to an internal connection 347A (e.g., as described in detail above with reference to the assembly 310 in FIG. 4, however, being associated with an opposite polarity).

In a similar manner, the second coil 341B of the first winding portion 340 is electrically coupled to a terminal 348B and an internal connection 347B and includes an operative portion 342B that extends between end turns; the third coil 341C of the first winding portion 340 is electrically coupled to a terminal 358C and an internal connection 347C and includes an operative portion 342C that extends between end turns; the first coil 351A of the second winding portion 350 is electrically coupled to a terminal 348A and the internal connection 347A and includes an operative portion 354A that extends between end turns; the second coil 351B of the second winding portion 350 is electrically coupled to a terminal 358B and the internal connection 347B and includes an operative portion 354B that extends between end turns; and the third coil 351C of the second winding portion 350 is electrically coupled to a terminal 348C and the internal connection 347C and includes an operative portion 354C, that extends between end turns.

As described above with reference to the assembly 310, the coils 341 of the first winding portion 320 each circumscribe an area that is associated with the corresponding phase (e.g., a phase from the phases described above associated with the assembly 310) and the coils 351 of the second winding portion 350 each circumscribe an area that is associated with the corresponding phase. For example, as shown in FIG. 7, the first coil 341A of the first winding portion 340 circumscribes an area 346A that is associated with the first phase, the second coil 341B of the first winding portion 340 circumscribes an area 346B that is associated with the second phase, and the third coil 341C of the first winding portion 340 circumscribes an area 346C that is associated with the third phase. Similarly, the first coil 351A of the second winding portion 350 circumscribes an area 356A that is associated with the first phase, the second coil 351B of the second winding portion 350 circumscribes an area 356B that is associated with the second phase, and the third coil 351C of the second winding portion 350 circumscribes an area 356C that is associated with the third phase. Moreover, when viewed in isolation from the other winding portions, the first winding portion 340 includes two areas that are circumscribed by one phase (i.e., an area circumscribed by the coil 341A but not the coil 341B and 341C, and an area circumscribed by the coil 341C but not the coil 341A and 341B); two areas circumscribed by two electrical phases (i.e., an area circumscribed by the coils 341A and 341B but not the area 341C, and an area circumscribed by the coils 341B and 341C but not the area 341A); and one area circumscribed by three electrical phases (i.e., an area circumscribed by the areas 341A, 341B, and 341C). The second winding portion 350 is similarly arranged and therefore, is not described in detail herein.

The first winding portion 340 and the second winding portion 350 of the offsetting assembly 315 are separated by a distance. In some embodiments, the distance can be associated with an offset of one magnetic pole, as described above with reference to the assembly 310. The separation of the first winding portion 340 and the second winding portion 350 on the assembly 315 is such that an area defined therebetween is not circumscribed by an electrical phase. For example, as shown in FIG. 7, when viewed in isolation, an area 349 defined between the third coil 341C of the first winding portion 340 and the first coil 351A of the second winding portion 350 is not circumscribed by an electrical phase, as described in further detail herein.

Figure 8:
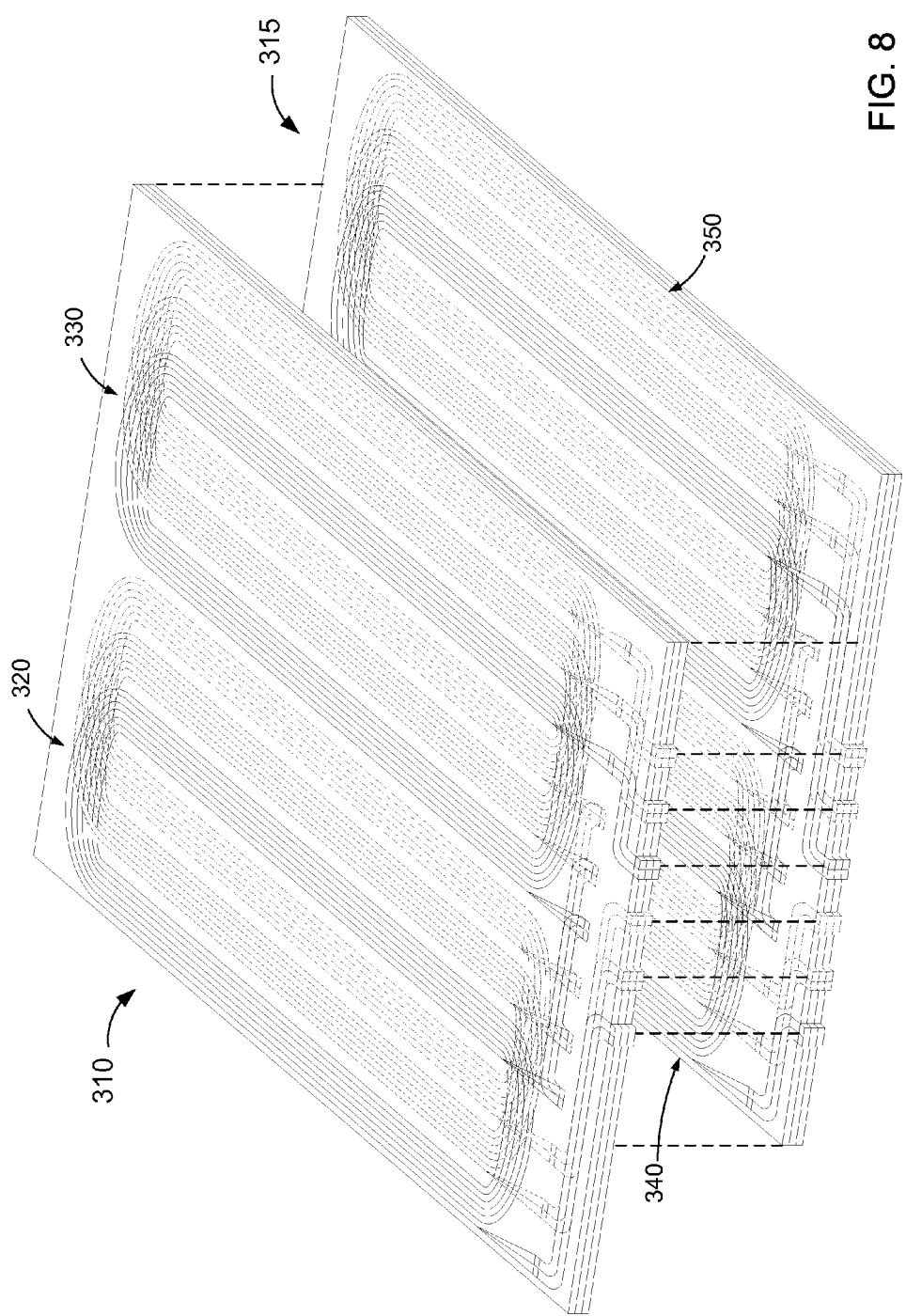
FIG. 8 is an exploded view of the laminated composite assembly of FIG. 4 and the laminated composite assembly of FIG. 7.

As shown in FIG. 8, the offsetting assembly 315 and the assembly 310 can be stacked. In some embodiments, once stacked the offsetting assembly 315 and the assembly 310 can be laminated together to form, for example, a stator segment. While described as two separate assemblies (e.g., the assembly 310 and the offsetting assembly 315) that are stacked and laminated, in other embodiments, the offsetting assembly 315 and the assembly 310 can be monolithically formed. Said another way, in some instances, the assembly 310 can form a first subset of layers of a stator segment and the offsetting assembly 315 can form a second subset layers of the stator segment (i.e., not necessarily formed from pre-manufactured, independent, or otherwise pre-defined laminated composite assemblies or PCBs).

Figure 9:
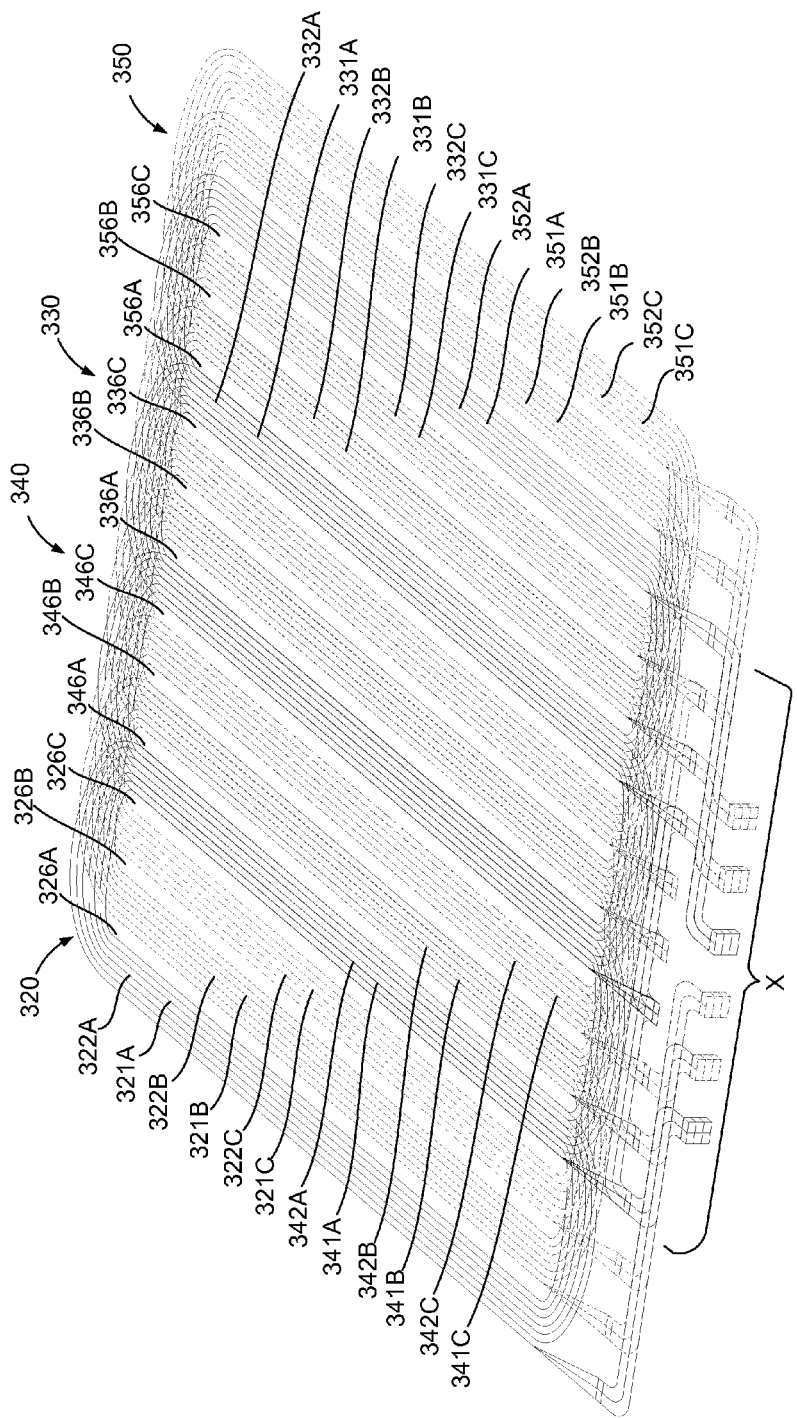
FIG. 9 is a schematic illustration of a set of winding portions of the laminated composite assembly and a set of winding portions of the second laminated composite assembly.

As shown in FIG. 9, the arrangement of the assembly 310 and the offsetting assembly 315 is such that an operative portion (e.g., a portion in which current is induced) of a coil on the assembly 310 is overlapped by a corresponding operative portion of a coil on the offsetting assembly 315. For example, the operative portion 342A of the first coil 341A of the first winding portion 340 overlaps the corresponding operative portion 322A of the first coil 321A of the first winding portion 320 and the corresponding operative portion 332A of the first coil 331A of the second winding portion 330. Similarly, the operative portion 342B of the second coil 341B of the first winding portion 340 overlaps the corresponding operative portion 322B of the second coil 321B of the first winding portion 320 and the corresponding operative portion 332B of the second coil 331B of the second winding portion 330; and the operative portion 342C of the third coil 341C of the first winding portion 340 overlaps the corresponding operative portion 322C of the third coil 321C of the first winding portion 320 and the corresponding operative portion 332C of the third coil 331C of the second winding portion 330.

In this manner, the arrangement of the offsetting assembly 315 and the assembly 310 is such that the offsetting assembly 315 is offset, relative to the assembly 310, by one magnetic pole. Moreover, the polarity of the first winding portion 340 and the second winding portion 350 of the offsetting assembly 315 is opposite the polarity of the first winding portion 330 and the second winding portion 330 of the assembly 310 (i.e., mirrored). Thus, a current that is carried on the operative portion 322A of the first coil 321A of the first winding portion 320 and a current that is carried on the overlapping operative portion 342A of the first coil 341A of the third winding portion 340 flows in a substantially similar direction (e.g., as described above with reference to FIG. 1). Moreover, as shown in FIGS. 8 and 9, the arrangement of the assembly 310 and the offsetting assembly 315 is such that the terminals of the assembly 310 (e.g., the terminals 328A, 328B, 328C, 338A, 338B, and 338C) are aligned with the terminals of the offsetting assembly 315 (e.g., the terminals 348A, 348B, 348C, 358A, 358B, and 358C). In some embodiments, the assembly 310 and the offsetting assembly 315 can be electrically coupled to similar terminals.

In this manner, the assembly 310 including the first winding portion 320 and the second winding portion 330 is symmetrically arranged (e.g., the coils are evenly spaced) yet is electrically phase imbalanced and the offsetting assembly 315 including the third winding portion 340 and the fourth winding portion 350 is symmetrically arranged yet is electrically phase imbalanced. Thus, by stacking the assembly 310 and the offsetting assembly 315 at an offset equal to the distance of one magnetic pole, the assembly 310 and the offsetting assembly 315 can collectively define a set of areas X that are symmetrically arranged and that substantially circumscribe all three phases. Thus, voltage imbalance produced by the different phases in, for example, a segmented stator can be reduced.

While not shown in FIGS. 4-9, any number of stator segments (i.e., one assembly 310 and one offsetting assembly 315 in a stacked configuration) can be disposed within an electromagnetic machine such as, for example, the machine structure 300 shown in FIG. 3. In this manner, any number of stator segments can be disposed adjacent to one another to form a segmented stator. In such embodiments, the segmented stator can have a symmetry that is similar to the symmetry shown, for example, in FIG. 9. Thus, each area (e.g., the areas in the region X in FIG. 9) can be circumscribed by coils associated with all three phases. Thus, the phase to phase voltage imbalance that would otherwise be present is reduced relative to the entire segmented stator.

As shown in FIGS. 8 and 9, by aligning the terminals 328A, 328B, 328C, 338A, 338B, and 338C of the assembly 310 with the terminals 348A, 348B, 348C, 358A, 358B, and 358C, respectively, of the offsetting assembly 315, a stator segment can be, for example, substantially modular. Therefore, in the case of failure of a stator segment (e.g., an assembly 310 and an offsetting assembly 315 collectively), the failed stator segment can be removed and replaced relatively easily.

While the assembly 310 and the offsetting assembly 315 are shown in FIGS. 8 and 9 as having substantially parallel operative portions that overlap, in other embodiments, the overlapping operative portions of the assembly 310 and the offsetting assembly 315 can be substantially nonparallel. For example, although the operative portions are shown in FIG. 8 as being parallel to an edge of the assembly 310 and/or the offsetting assembly 315, in other embodiments, the operative portions can be disposed at an angle relative to the edge of the assembly 310 and/or the offsetting assembly 315. In such embodiments, by disposing the operative portions at an angle, the alignment of the overlapping operative portions is facilitated. Similarly stated, disposing the operative portions at an angle can provide a tolerance that is sufficient to allow, for example, thermal expansion of the assembly 310 and/or the offsetting assembly 315 during use.

While the assemblies 110, 310, and 315 are shown and described above as carrying a voltage associated with three phases, in other embodiments, a laminated composite assembly can be configured to carry a voltage associated with any number of phases. For example, in some embodiments, an assembly can carry a voltage associated with two phases (i.e., include two coils). In other embodiments, an assembly can carry a voltage associated with four, five, six, seven, eight, nine, ten, or more phases in an appropriate number of coils.

Although the assemblies 110, 310, and 315 are shown and described above as including machine coils that are in an electrically series configuration, in other embodiments, an assembly can include two or more machine coils per phase that are arranged in an electrically parallel configuration. In other embodiments, an assembly can include a set of machine coils that can include at least two machine coils per phase in an electrically series configuration and at least two machine coils in an electrically parallel configuration. In other embodiments, an assembly can include a set of machine coils that includes a single machine coil per phase in either a series or parallel configuration.

While distances defined by one or more portions of the assemblies 110, 310, and/or 315 described above are associated with a reference point along a centerline of the portions (e.g., a centerline of a coil), in other embodiments, similar distances can be associated with any given point included in a portion of an assembly and a corresponding point included in a corresponding portion of the assembly. While areas associated with a phase are described above as being bounded by a centerline of a coil associated with the phase (e.g., the area 126A is bounded by the centerline of the coil 121A as shown in FIG. 1), in other embodiments, an area associated with a phase can be bounded by any portion of a coil associated the phase. For example, in some embodiments, an innermost coil of a set of concentric coils associated with a phase can define or bound an area associated with the phase. In other embodiments, an outermost coil of a set of concentric coils associated with a phase can define or bound an area associated with the phase.

While various embodiments have been described above, it should be understood that they have been presented by way of example only, and not limitation, and as such, various changes in form and/or detail may be made. For example, while the assemblies 110, 310, and 315 describe overlapping windings disposed on a laminated composite assembly, the methods and arrangements described herein can be applied to, for example, wire-wound assemblies (e.g., stators), iron-core assemblies (e.g., stators) and/or the like. Any portion of the apparatus and/or methods described herein may be combined in any suitable combination, unless explicitly expressed otherwise. Where methods and/or schematics described above indicate certain events occurring in certain order, the ordering of certain events and/or flow patterns may be modified. Additionally, certain events may be performed concurrently in parallel processes when possible, as well as performed sequentially.

Although various embodiments have been described as having particular features and/or combinations of components, other embodiments are possible having a combination of any features and/or components from any of embodiments as discussed above.

What is claimed is:

1. An apparatus, comprising:
a first winding portion from a plurality of winding portions, the first winding portion having a plurality of coils, each coil from the plurality of coils of the first winding portion being associated with a different electrical phase from a plurality of electrical phases, each coil from the plurality of coils of the first winding portion circumscribing a different area from a plurality of areas circumscribed by the plurality of coils on the first winding portion, at least a portion of each coil from the plurality of coils of the first winding portion collectively defining a first layer,
the first winding portion configured to at least partially overlap a second winding portion (1) from the plurality of winding portions and (2) having a plurality of coils associated with the plurality of electrical phases,
the first winding portion configured to at least partially overlap a third winding portion (1) from the plurality of winding portions and (2) having a plurality of coils associated with the plurality of electrical phases, at least a portion of each coil from the plurality of coils of the second winding portion and at least a portion of each coil from the plurality of coils of the third winding portion collectively defining a second layer substantially parallel to the first layer,
the first winding portion configured to at least partially overlap the second winding portion and the third winding portion such that an area on the second layer and between a portion of a coil, (1) from the plurality of coils of the second winding portion and (2) associated with an electrical phase from the plurality of electrical phases, and a portion of a coil, (1) from the plurality of coils of the third winding portion and (2) associated with the electrical phase, is substantially circumscribed by a coil (1) from the plurality of coils of the first winding portion and (2) associated with the electrical phase.

2. The apparatus of claim 1, wherein the first winding portion is part of a laminated composite assembly.

3. The apparatus of claim 1, wherein the first winding portion is configured to at least partially overlap the second winding portion and the third winding portion such that each area from the plurality of areas not circumscribed by each coil from the plurality of coils of the first winding portion is substantially circumscribed by at least one coil from the plurality of coils on the second winding portion or at least one coil from the plurality of coils on the third winding portion.

4. The apparatus of claim 1, wherein a coil from the plurality of coils of the first winding portion includes a first operative portion configured to facilitate current flow in a first direction and a second operative portion configured to facilitate current flow in a second direction substantially opposite the first direction, the first winding portion configured to at least partially overlap the second winding portion and the third winding portion such that the first operative portion substantially overlaps a operative portion configured to facilitate current flow in the first direction on the second winding portion and the second operative portion substantially overlaps an operative portion configured to facilitate current flow in the second direction on the third winding portion.

5. The apparatus of claim 1, wherein a first coil from the plurality of coils of the first winding portion is on a plurality of layers of the first winding portion.

6. The apparatus of claim 1, wherein the first winding portion is configured such that a current is induced in each coil from the plurality of coils of the first winding portion in response to a magnetic field from a rotor moving with respect to the first winding portion.

7. The apparatus of claim 1, wherein the first winding portion is configured to at least partially overlap the second winding portion such that an operative portion of a coil from the plurality of coils of the first winding portion and an operative portion of a coil (1) from the plurality of coils of the second winding portion and (2) substantially overlapping the coil from the plurality of coils of the first winding portion, are configured to facilitate current flow in a common direction and at a common phase angle.

8. The apparatus of claim 1, wherein the first winding portion is configured to at least partially overlap the second winding portion such that at least one operative portion of a coil (1) associated with an electrical phase from the plurality of electrical phases and (2) from the plurality of coils of the first winding portion, at least partially overlaps at least one operative portion of a coil (1) associated with the electrical phase and (2) from the plurality of coils of the second winding portion.

9. The apparatus of claim 1, wherein the plurality of winding portions form a machine stator.

10. The apparatus of claim 1, wherein each area from the plurality of areas is a magnetic flux carrying area.

11. The apparatus of claim 1, wherein the first layer is a first plane and the second layer is a second plane substantially parallel to the first plane.

12. The apparatus of claim 1, wherein the plurality of winding portions form a machine stator within a radial machine.

13. An apparatus, comprising:
a plurality of winding portions, each winding portion from the plurality of winding portions having a plurality of coils associated with a plurality of electrical phases, each coil from the plurality of coils having an operative portion configured to facilitate current flow in a direction, each winding portion from the plurality of winding portions configured to substantially overlap at least one remaining winding portion from the plurality of winding portions such that the operative portion of a coil from the plurality of coils on that winding portion and associated with an electrical phase from the plurality of electrical phases (1) is substantially aligned with the operative portion of a coil from the plurality of coils on the at least one remaining winding portion and associated with the electrical phase from the plurality of electrical phases and (2) facilitates a current flow in substantially the same direction as a current flow of the operative portion of the coil from the plurality of coils on the at least one remaining winding portion with which the operative portion of the coil from the plurality of coils on that winding portion is substantially aligned.

14. The apparatus of claim 13, wherein each winding portion from the plurality of winding portions is a laminated composite assembly.

15. The apparatus of claim 13, wherein the operative portion on each coil from the plurality of coils is a first operative portion, each coil from the plurality of coils having a second operative portion, each winding portion from the plurality of winding portions is configured to substantially overlap a first remaining winding portion from the plurality of winding portions and a second remaining winding portion from the plurality of winding portions such that the first operative portion of a coil on that winding portion is substantially aligned with the first operative portion of a coil on the first remaining winding portion and the second operative portion of the coil on that winding portion is substantially aligned with the second operative portion of the coil on the second remaining winding portion.

16. The apparatus of claim 13, wherein the operative portion on each coil from the plurality of coils is a first operative portion, the direction is a first direction, each coil from the plurality of coils including a second operative portion configured to facilitate current flow in a second direction substantially opposite the first direction.

17. The apparatus of claim 13, wherein a first coil from the plurality of coils of a winding portion from the plurality of winding portions is on a plurality of layers of the winding portion.

18. The apparatus of claim 13, wherein each winding portion from the plurality of winding portions is configured such that a current is induced in each coil from the plurality of coils of that winding portion in response to a magnetic field from a rotor moving with respect to that winding portion.

19. The apparatus of claim 13, wherein a position, on a first winding portion from the plurality of winding portions, of the operative portion of a coil associated with the electrical phase and from the plurality of coils of the first winding portion is different than a position, on a second winding portion from the plurality of winding portions, of the operative portion of a coil associated with the electrical phase and from the plurality of coils of the second winding portion.

20. An apparatus, comprising:
a plurality of winding portions, each winding portion from the plurality of winding portions having a plurality of coils, each coil from the plurality of coils of each winding portion from the plurality of winding portions (1) being associated with a different electrical phase from a plurality of electrical phases and (2) circumscribing a different area from a plurality of areas circumscribed by the plurality of coils on that winding portion, at least a portion of a coil (1) of a winding portion from the plurality of winding portions and (2) associated with a first electrical phase from the plurality of electrical phases, defining a layer, at least a portion of a coil (1) of the winding portion from the plurality of winding portions and (2) associated with a second electrical phase, from the plurality of electrical phases and different from the first electrical phase, being disposed on the layer, at least a portion of a coil (1) of the winding portion from the plurality of winding portions and 2 associated with a third electrical phase, from the plurality of electrical phases and different from the first electrical phase and the second electrical phase, being disposed on the layer, each winding portion from the plurality of winding portions configured to substantially overlap at least two remaining winding portions from the plurality of winding portions such that each area from the plurality of areas on each winding portion from the plurality of winding portions is circumscribed by a coil associated with each electrical phase from the plurality of electrical phases.

21. The apparatus of claim 20, wherein each coil from the plurality of coils of each winding portion from the plurality of winding portions includes a first operative portion configured to facilitate current flow in a first direction and a second operative portion configured to facilitate current flow in a second direction substantially opposite the first direction, each winding portion from the plurality of winding portions configured to at least partially overlap a remaining winding portion from the at least two remaining winding portions such that the first operative portion of a coil associated with an electrical phase from the plurality of electrical phases and from the plurality of coils on that winding portion substantially overlaps the first operative portion of a coil associated with the electrical phase and from the plurality of coils on the remaining winding portion.

22. The apparatus of claim 20, wherein each winding portion from the plurality of winding portions is a laminated composite assembly.

23. The apparatus of claim 20, wherein each winding portion from the plurality of winding portions is configured to at least partially overlap a remaining winding portion from the at least two remaining winding portions such that the first operative portion of a coil associated with an electrical phase from the plurality of electrical phases and from the plurality of coils on that winding portion (1) facilitates a current flow in a first direction and (2) substantially overlaps the first operative portion of a coil associated with the electrical phase and from the plurality of coils on the remaining winding portion and which facilitates a current flow in the first direction.

24. The apparatus of claim 20, wherein a winding portion from the plurality of winding portions is configured such that a current is induced in each coil from the plurality of coils of the winding portion in response to a magnetic field from a rotor moving with respect to the winding portion.

25. The apparatus of claim 20, wherein the layer is a plane.

26. The apparatus of claim 20, wherein the plurality of winding portions form a machine stator within a radial machine.

* * * * *

UNITED STATES PATENT AND TRADEMARK OFFICE
CERTIFICATE OF CORRECTION

| | |
|---|---|
| PATENT NO. | : 8,736,133 B1 |
| APPLICATION NO. | : 13/829123 |
| DATED | : May 27, 2014 |
| INVENTOR(S) | : James S. Smith et al. |

It is certified that error appears in the above-identified patent and that said Letters Patent is hereby corrected as shown below:

In the Claims:

Column 19, line 8, "tially overlaps a operative portion configured to facili-" should read "tially overlaps an operative portion configured to facili-".

Column 19, line 14, "The apparatus of claim 1, wherein a first coil from the" should read "The apparatus of claim 1, wherein a coil from the".

Column 20, line 66, "the plurality of winding portions and 2 associated with a" should read "the plurality of winding portions and (2) associated with a".

Signed and Sealed this
Twenty-fourth Day of February, 2015

Michelle K. Lee
*Deputy Director of the United States Patent and Trademark Office*